United States Patent
Sasaki et al.

(10) Patent No.: US 8,353,773 B2
(45) Date of Patent: Jan. 15, 2013

(54) COMMUNICATION GAME SYSTEM, GAME APPARATUS, SERVER, STORAGE MEDIUM STORING A PROGRAM, AND GAME CONTROL METHOD

(75) Inventors: Tetsuya Sasaki, Kyoto (JP); Yosuke Hatayama, Kyoto (JP); Daisuke Nakamura, Kyoto (JP); Yoshitaka Shirota, Kyoto (JP); Masaru Mitsuyoshi, Kyoto (JP); Yutaka Takehisa, Kyoto (JP); Katsuya Eguchi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 12/483,587

(22) Filed: Jun. 12, 2009

(65) Prior Publication Data
US 2009/0247304 A1 Oct. 1, 2009

Related U.S. Application Data

(62) Division of application No. 11/429,250, filed on May 8, 2006.

(30) Foreign Application Priority Data

May 6, 2005 (JP) .................................. 2005-135121
Jul. 27, 2005 (JP) .................................. 2005-217404

(51) Int. Cl.
*A63F 13/12* (2006.01)
*G06F 15/16* (2006.01)
(52) U.S. Cl. ......................................... 463/42; 709/227
(58) Field of Classification Search .................... 463/40, 463/41, 42, 43; 709/227
See application file for complete search history.

(56) References Cited

U.S. PATENT DOCUMENTS 3,008,367 A 11/1961 Parsons et al
(Continued)

FOREIGN PATENT DOCUMENTS

EP 1475939 11/2004
(Continued)

OTHER PUBLICATIONS

Anonymous, SIP/SIMPLE Presence Specification, Open Mobile Alliance, OMA-PAG-SIMPLE-Spec-V1_0_0-20041118-D, Nov. 18, 2004, pp. 1-86.

(Continued)

*Primary Examiner* — Damon Pierce
(74) *Attorney, Agent, or Firm* — Nixon & Vanderhye P.C.

(57) ABSTRACT

A communication game system includes a plurality of game apparatuses which are able to wirelessly communicate with each other. Each game apparatus registers identifying information of an opponent obtained by a short-distance wireless communication or by user's manual input in a friend list. Thereafter, the game apparatus connects to the Internet, and inquiries whether it is possible to communicate with an opponent in the friend list over the network. If it is possible to communicate, the game apparatus obtains an address of the opponent to make a network communication. Even if a user makes a short distance wireless communication with a friend to exchange and register the identifying information or registers the friend by hand and then is parted from the friend, the user can safely communicate with the friend across the network without being exposed to unknown players. In a case that an additional opponent is to be added to the multiplayer game session, one of the participants transmits identifying information to introduce the communicating opponents to each other. The game apparatuses introduced to each other make a communication over the network, and add the identifying information of the opponents to the friend list, if necessary.

18 Claims, 27 Drawing Sheets

U.S. PATENT DOCUMENTS

| | | | |
|---|---|---|---|
| 4,149,444 | A | 4/1979 | Parsons |
| 4,679,479 | A | 7/1987 | Koyamato |
| 4,821,121 | A | 4/1989 | Beaulier |
| 4,913,023 | A | 4/1990 | Mizuguchi et al. |
| 5,618,179 | A | 4/1997 | Copperman et al. |
| 6,115,036 | A | 9/2000 | Yamato et al. |
| 6,203,433 | B1 | 3/2001 | Kume |
| 6,366,283 | B1 | 4/2002 | Tampieri |
| 6,488,505 | B1 | 12/2002 | Hightower |
| 6,645,067 | B1 | 11/2003 | Okita et al. |
| 6,658,464 | B2 | 12/2003 | Reisman |
| 6,692,359 | B1 | 2/2004 | Williams et al. |
| 6,699,125 | B2 | 3/2004 | Kirmse et al. |
| 6,755,654 | B2 | 6/2004 | Hightower |
| 6,821,205 | B2 | 11/2004 | Takahashi et al. |
| 6,845,389 | B1 | 1/2005 | Sen et al. |
| 6,848,997 | B1 | 2/2005 | Hashimoto et al. |
| 6,884,171 | B2 | 4/2005 | Eck et al. |
| 7,032,007 | B2 | 4/2006 | Fellenstein et al. |
| 7,066,818 | B2 | 6/2006 | Ikeda |
| 7,099,304 | B2 | 8/2006 | Liu et al. |
| 7,311,608 | B1 | 12/2007 | Danieli et al. |
| 2002/0086730 | A1 | 7/2002 | Nakai |
| 2002/0142842 | A1 | 10/2002 | Easley et al. |
| 2002/0142846 | A1 | 10/2002 | Paulsen |
| 2002/0183117 | A1* | 12/2002 | Takahashi et al. ............. 463/42 |
| 2003/0051003 | A1 | 3/2003 | Clark et al. |
| 2003/0125112 | A1 | 7/2003 | Silvester |
| 2003/0233537 | A1 | 12/2003 | Wohlgemuth et al. |
| 2004/0002382 | A1 | 1/2004 | Ho et al. |
| 2004/0002384 | A1 | 1/2004 | Multerer et al. |
| 2004/0111479 | A1 | 6/2004 | Borden et al. |
| 2004/0152517 | A1 | 8/2004 | Hardisty et al. |
| 2004/0153557 | A1 | 8/2004 | Shochet et al. |
| 2004/0162144 | A1 | 8/2004 | Loose et al. |
| 2004/0164897 | A1 | 8/2004 | Treadwell et al. |
| 2004/0192440 | A1 | 9/2004 | Evans et al. |
| 2004/0224741 | A1 | 11/2004 | Jen et al. |
| 2004/0224769 | A1 | 11/2004 | Hansen et al. |
| 2004/0224772 | A1 | 11/2004 | Canessa et al. |
| 2004/0225386 | A1 | 11/2004 | Thompson et al. |
| 2005/0160144 | A1 | 7/2005 | Bhatia |
| 2005/0239550 | A1 | 10/2005 | Hardisty et al. |

FOREIGN PATENT DOCUMENTS

| | | |
|---|---|---|
| JP | 11-057215 | 3/1999 |
| JP | 11-207031 | 8/1999 |
| JP | 2002-045573 | 2/2002 |
| JP | 2002-157204 | 5/2002 |
| JP | 2004-054340 | 2/2004 |
| JP | 2004-302763 | 10/2004 |
| JP | 2005-006766 | 1/2005 |
| JP | 2005-046304 | 2/2005 |
| JP | 2005-103265 | 4/2005 |
| WO | 02/061707 | 8/2002 |
| WO | 2007/022487 A2 | 2/2007 |

OTHER PUBLICATIONS

N-Gage, Oct. 7, 2003, "http://en.wikipedia.org/wiki/N-Gage".
Partial English translation of "E3 (electronic entertainment expo), Thoroughly report ultimate event!", *Weekly Famitsu*, published by Enterbrain, Inc., Jun. 4, 2004 (8 pages).
Partial English translation of "PSP Tool", *Windows 100%*, published by Shinyusha Co., Ltd., May 1, 2005 (8 pages).
Japanese Notification of Reason(s) for Refusal dated Feb. 15, 2011 (4 pages).
AOL, www.aol.com, http://games.aol.com/aimgames, 11 pages (2006).
Engage (merely listed—see NPL 16, pp. 6-7 (IDS filed in 723-1658 on Mar. 2, 2006) for more details).
Dwango (merely listed—see NPL 16, pp. 6-7 (IDS filed in 723-1658 on Mar. 2, 2006) for more details).
MPG-Net (merely listed—see NPL 16, pp. 6-7 (IDS filed in 723-1658 on Mar. 2, 2006) for more details).
Quantum Link (merely listed—see NPL 16, pp. 6-7 (IDS filed in 723-1658 on Mar. 2, 2006) for more details).
www.zone.com, MSN Games, People and Chat, 3 pages (2006).
www.pogo.com, 3 pages.
http://www.cnn.com/TECH/computing/9802/12/online_gaming_part2/, Feb. 12, 1998, 4 pages.
http://www.findarticles.com/p/articles/mi_m0EIN/is_1996_May_16/ai_18290451, May 16, 1996, 2 pages.
http://games.ign.com/objects/027/027615.html, 3 pages (1996-2000).
http://www.internetnews.com/xSP/article.php/45591, Dec. 18, 1998, 4 pages.
International Preliminary Report on Patentability (Feb. 28, 2008).and Written Opinion of the International Search Authority for PCT/US2006/032538 (Jan. 26, 2007), 11 pages.
Nokia Press Release, "New N-Gage™ Titles Turn Up the Heat on Mobile Gaming", Dec. 1, 2003, 2 pages, http://press.nokia.com/PR/200312/926705_5.html.
Nokia Press Release, "Nokia shows multiplayer Java games with key community features at E3", May 12, 2004, 2 pages, http://press.nokia.com/PR/200405/945290_5.html.
Information Disclosures Statement filed in U.S. Appl. No. 11/207,194 (Mar. 2, 2006).
www.safelibraries.org, Dangers Children Face in Cyberspace, 2 pages (Mar. 2006).
CheckIM.com, "Proactive protection for the masses, About," 2 pages (2004).
CheckIM.com, "Proactive protection for the masses, Trace Online Predators," 2 pages (2005).
Wave Race—Blue Storm for the Nintendo GameCube platform (merely listed—see NPL 16, pp. 1-2 (IDS filed in 723-1658 on Mar. 2, 2006) for more details).
Activision's Tony Hawk American Sk8Land for Nintendo DS (merely listed—see NPL 16, pp. 1-2 (IDS filed in 723-1658 on Mar. 2, 2006) for more details).
Namco's Ridge Racer 6 for Xbox 360 (merely listed—see NPL 16, pp. 1-2 (IDS filed in 723-1658 on Mar. 2, 2006) for more details).
Sony's Wipeout Pure for PSP (merely listed—see NPL 16, pp. 1-2 (IDS filed in 723-1658 on Mar. 2, 2006) for more details).
Vivendi's Crash Nitro Kart for NGage (merely listed—see NPL 16, pp. 1-2 (IDS filed in 723-1658 on Mar. 2, 2006) for more details).
Midway's San Francisco Rush 2049 for the Sega Dreamcast (merely listed—see NPL 16, pp. 1-2 (IDS filed in 723-1658 on Mar. 2, 2006 for more details).
Xbox Live, http://www.xbox.com/en-US/live 4 pages (downloaded Feb. 28, 2006).
GameSpy, www.gamespy.net, 3 pages (copyright 1995-2005).
Quazal, www.quazal.com, 10 pages (2004).
SegaNet (merely listed—see NPL 16, p. 4 (IDS filed in 723-1658 on Mar. 2, 2006) for more details).
Warp Pipe, www.warppipe.com, http://cubeonline.warppipe.com/gettingstarted/finding_opponents.html, 4 pages. (2003-2006).
NGage Arena, www.n-gage.com, http://www.n-gage.com/en-US/support/NgageArena/featuresglossary.htm, 4 pages (2006).
Battle.net, www.battle.net, 5 pages (2006).
Xfire, www.xfire.com, 14 pages (2006).
Demonware, www.demonware.net, 6 pages (2006).
Mplayer, http://web.archive.org/web/20000510010549/http://mplayer.com/, http://web.archive.org/web/20001109171600/www.mplayer.com/gamers/help/online, 5 pages (May 9, 2000).
TEN (Total Entertainment Network), Business Wire (1996).
Sega HEAT (merely listed—see NPL 16, p. 5 (IDS filed in 723-1658 on Mar. 2, 2006) for more details).
Kali, www.kali.net, 2 pages (1995-2005).
GameSpot, www.gamespot.com, 5 pages (2006).

* cited by examiner

FIG. 6

MEMORY MAP OF SERVER

ON-LINE MACHINE LIST STORING AREA ~ 84

| GAME NAME | ID | CONNECTION ADDRESS | PLAYER NAME |
|---|---|---|---|
| GAME A | PY66 | aaaa | HIROSHI |
| | K58F | bbbb | MAMORU |
| | 8LY5 | cccc | JIRO |
| | ⋮ | ⋮ | ⋮ |
| GAME B | ... | ... | ... |

⋮

FIG. 9
(A)
WHERE IS A FRIEND WITH WHOM A
COMMUNICATION IS MADE?
   NEARBY FRIEND
DISTANT FRIEND
(B)
WHERE IS A FRIEND WITH WHOM A
COMMUNICATION IS MADE?
   NEARBY FRIEND
*DISTANT FRIEND*

FIG. 27

MEMORY MAP OF SERVER 84

ON-LINE MACHINE LIST STORING AREA

| GAME NAME | ID | CONNECTION ADDRESS | PLAYER NAME | FRIEND LIST | |
|---|---|---|---|---|---|
| GAME A | PY66 | aaaa | HIROSHI | K58F | MAMORU |
| | | | | 8LY5 | JIRO |
| | K58F | bbbb | MAMORU | PY66 | HIROSHI |
| | | | | 8LY5 | JIRO |
| | 8LY5 | cccc | JIRO | PY66 | HIROSHI |
| | | | | K58F | MAMORU |
| | ⋮ | ⋮ | ⋮ | ⋮ | ⋮ |
| GAME B | ... | ... | ... | ... | ... |

⋮

COMMUNICATION GAME SYSTEM, GAME APPARATUS, SERVER, STORAGE MEDIUM STORING A PROGRAM, AND GAME CONTROL METHOD

CROSS REFERENCE OF RELATED APPLICATION

This application is a divisional of application Ser. No. 11/429,250 filed May 8, 2006, which in turns claims priority of Japanese Patent Application Nos. 2005-135121, 2005-217404, the entire content of which is incorporated herein by reference.

BACKGROUND OF THE INVENTION

1. Field of the Invention

An exemplary illustrative non-limiting implementation of a game communication system, a game apparatus utilized for the same, a storage medium storing a game program of the game apparatus, a server, a storage medium storing a communication processing program of the server, and a game control method are disclosed herein. More specifically, the exemplary game communication system implementation disclosed herein relates to a communication system that allows a plurality of game apparatuses to communicate one another over a network, a game apparatus utilized for the same, a storage medium storing a game program of the game apparatus, a server, a storage medium storing a communication processing program of the server, and a game control method.

2. Description of the Related Art

In a conventional network game system or an on-line game system, a player connected a terminal (personal computer, game console, etc.) to a server across a network, determined an opponent of a game out of players of other terminals connected to the server, and played a game (fighting game, role-playing game, etc.) with the player. One example of this kind of a conventional network game system is disclosed in the Document 1 (Japanese Patent Laying-open No. 2002-45573). Players who play a network game are basically unknown to each other. Each player determines whether or not to play a game by making a communication in a chat room, or directly plays a game with an unknown player, for example. Players who want to play a network game among friends accommodate a schedule including an hour, a place to play with (server, lobby, room, or the like), and so on, and connect to the server from the respective terminals on schedule to play the game with the friend.

On the other hand, the document 2 (Japanese Patent Laying-open No. 2005-6766) discloses one example of a game system in which a communication game by a short distance wireless communication is performed. The technique in the document 2, other game which exists in the range where a communication is possible is retrieved to perform an interactive network game among a plurality of game apparatuses.

In the conventional network game system, since a player can communicate with an unknown player, if the opponent has player's information necessary for a communication, even if the player does not know the opponent at all, the player may unilaterally be connected by the opponent. Thus, the player has to suddenly play a game with an unknown player, so that there is a fear of violating a rule or a manner such as a hacker action by some quarters by dint of anonymous. This makes it difficult for a general user to play the network game. Furthermore, if both friends play a game, they have to talk about a time, etc. in advance by telephone or by e-mail, and behave as planned, resulting in being bother.

Such a conventional network game includes factors making a user feel anxious and bother, and this makes it difficult for a general user to easily participate in and to securely and freely enjoy the network game.

On the other hand, in the technique of the document 2, it is possible to make a communication game by a short-range wireless while seeing a face of a nearby opponent, so that it is possible to play a game securely and freely. However, it is possible for the players to play a game in the only range where a wireless communication is possible, so that when the players moves away from each other for going home, for example, they cannot play the communication game.

SUMMARY OF THE INVENTION

The exemplary illustrative non-limiting implementation disclosed herein has an advantage of providing a novel communication game system, game apparatus utilized for the same, storage medium storing a game program of the game apparatus, server, storage medium storing a communication processing program of the server, and game control method.

Another advantage of the non-limiting example implementation disclosed herein is to provide a communication game system, a game apparatus utilized for the same, a storage medium storing a game program of the game apparatus, a server, a storage medium storing a communication processing program of the server, and a game control method which can realize a network game in which users can easily participate.

Yet another advantage of the non-limiting example implementation disclosed herein is to provide a communication game system, a game apparatus utilized for the same, a storage medium storing a game program of the game apparatus, a server, a storage medium storing a communication processing program of the server, and a game control method which can realize a network game in which a network communication is possible with only an opponent whose identifying information is registered.

A further advantage of the non-limiting example implementation disclosed herein is to provide a communication game system, a game apparatus utilized for the same, a storage medium storing a game program of the game apparatus, a server, a storage medium storing a communication processing program of the server, and a game control method which allow an opponent exists some distance from a player to communicate even after a communication is made with the opponent by a short distance wireless communication.

A communication game system in accordance with at least one exemplary illustrative non-limiting implementation is a communication game system including a plurality of game apparatuses. Each game apparatus comprises a first storing means, a registering means, a network connecting means, a determining means, and a first communication means. The first storing means stores its own identifying information. The registering means registers opponent identifying information being the identifying information of other game apparatus. The network connecting means connects to an access point to allow an access to a network for performing a network communication. The determining means determines whether or not a network communication is allowable with the other game apparatus corresponding to the opponent identifying information registered by the registering means when the network connecting means connects to the network via the access point. The first communication means makes a network communication with the other game apparatus about which a network communication is allowable is determined by the determining means.

More specifically, the communication game system is for performing a communication game over a network such as the Internet, for example, and includes a plurality of game apparatuses (10: reference number corresponding an example implementation described later). As to each game apparatus, the first storing means (48, 74) stores its own identifying information. In the example implementation described later, an ID and a player name as the identifying information are stored. The registering means (42, 48, 28b, 80, S21, S47, S49, S289-S293) registers opponent identifying information being the identifying information of other game apparatus. The opponent identifying information is obtained by exchanging it with other game apparatus or its player, and is stored as friend list data in the example implementation described later. For exchange, a game apparatus can output its own identifying information, for example. The opponent identifying information may be obtained from other game apparatus with which a communication is made by a short distance wireless communication, for example. Or, it may be possible that the identifying information may be obtained by giving it to and taking it from an opponent player in advance, and then, the opponent identifying information is input by the player. In order for the opponent player to know it, its own identifying information is displayed, for example. The network connecting means (42, 64, S65) is connected to an access point (70) for performing a network communication. The access point is a wireless LAN access point set at home or at a public wireless LAN, for example and the game apparatus is connected to the network such as the Internet through an access point. The determining means (42, S83, 5303) determines whether or not a network communication is allowable with the other game apparatus corresponding to the opponent identifying information registered by the registering means when a network connection is performed through the access point. For example, if a server (72) managing on-line information indicative of an on-line game apparatus is provided on the network, the determining means may inquire to the server to make a determination on the basis of the result of the inquiry. The first communication means (42, 64, S93, S95, 5305, 5307) makes a network communication with the other game apparatus about which a network communication is allowable is determined by the determining means.

According to the above implementation, the opponent identifying information is registered. Also, each game apparatus accesses a network through an access point, and determines whether or not a network communication is allowable with other game apparatus corresponding to the registered opponent identifying information. Then, when it is determined that the network communication is allowable, a communication is made with the opponent across the network. Thus, each game apparatus determines whether or not a network communication is possible with the opponent who has registered its identifying information, and if possible, a network communication can be made with the registered opponent. Accordingly, a communication game can be made with only the opponent whose identifying information is registered, and therefore, it becomes possible to participate in a network game safely and easily. This allows general game users who avoid playing a network game to easily participate in the network game. Also, merely registering friend's identifying information allows the player to make a network communication with the friend.

In one aspect, each game apparatus further comprises a second communication means for making a communication with the other game apparatus by a short distance wireless communication. The registering means stores in a second storing means the opponent identifying information received from the game apparatus through the communication by the second communication means.

More specifically, a second communication means (42, 64, S21, S39, S41, S45, S47) of a game apparatus performs a communication with other game apparatus by a short distance wireless communication. The registering means (S49) stores in the second storing means (48, 28b, 80) the opponent identifying information received from the game apparatus through the short-distance wireless communication. Thus, the identifying information of the opponent with which the short-distance wireless communication is made can be obtained and registered. Accordingly, even if the user makes a communication by the short distance wireless communication with a friend, and then is parted from the friend, the user can communicate with the friend across the network.

In another aspect, a server is further provided on the network. Each game apparatus further comprises a notifying means and an inquiring means. The notifying means transmits to the server a notification including its own identifying information and indicative of being connected to the network. The inquiring means transmits an inquiry whether or not the game apparatus corresponding to the opponent identifying information stored in the second storing means is being connected to the network. The server comprises an on-line machine list storing means, a first detecting means, and a responding means. The on-line machine list storing means stores in the third storing means at least the its own identifying information and an address of the game apparatus being connected to the network on the basis of the notification. The first detecting means determines whether or not the received opponent identifying information is stored in the third storing means when the inquiry is received. The responding means transmits the address of the game apparatus corresponding to the opponent identifying information to the game apparatus which has transmitted the inquiry when the first detecting means determines that the opponent identifying information is stored in the third storing means. The determining means of the game apparatus determines whether or not the game apparatus is being connected to the network on the basis of an inquiry result received from the server. The first communication means makes a network communication with the other game apparatus on the basis of the address received from the server when the determining means determines that the other game apparatus is being connected to the network.

More specifically, the communication game system further includes a server (72) provided on the network or to be connectable over a network. The notifying means (42, S67, S71, S171) of the game apparatus transmits to the server a notification including it's own identifying information and indicating that it is being connected to the network. In the non-limiting example implementation described later, the notifying data includes an ID, a player name, a connection address, a game name, etc. and is transmitted every fixed time period, for example. The on-line machine list storing means (S203) of the server is managed by the notification, for example, and stores in the third storing means (84) at least the its own identifying information and an address of the game apparatus being connected to the network. In the non-limiting example implementation described later, the on-line machine list data including an ID, a player name, a connection address, a game name, and the like of the game apparatus which is being connected to the server is stored. Thus, the server manages information of the game apparatus which is being connected to the network is managed. The inquiring means (42, 64, S77,S301) of the game apparatus inquires whether or not the other game apparatus corresponding to the registered opponent identifying means is being connected to the network. The inquiry object includes all registered opponent identifying information or a part of the opponent identifying information selected by a player, for example. In the non-limiting example implementation described later, inquiry data including at least an ID of a game apparatus to be inquired is transmitted. The first detecting means (S207, S209, S323, S325) determines whether or not the received opponent identifying information is stored in the third storing means, that is, the game apparatus corresponding to the opponent identifying information is being connected to the network when the inquiry is received. The responding means (S211, S213, S331, S333) transmits the address of the game apparatus corresponding to the opponent identifying information to the game apparatus which has transmitted the inquiry when it is determined that the opponent identifying information is stored in the third storing means. Also, in a non-limiting example implementation described later, when it is determined that a game apparatus to be inquired is not being connected, data indicating that it is not impossible to communicate is transmitted. The determining means of the game apparatus determines whether or not the game apparatus corresponding to the registered opponent identifying information is being connected to the network on the basis of an inquiry result received from the server. That is, it is determined whether or not a network communication can be performed with other game apparatus corresponding to the opponent identifying information registered by a short distance wireless communication. The first communication means (42, 64, S93, S95, S305, S307) makes a network communication with the game apparatus on the basis of the address received from the server when the game apparatus corresponding to the registered opponent identifying information is being connected to the network. Thus, the identifying information of the game apparatus being connected the network is managed by the server, so that whether the opponent registered by the short distance wireless communication is being connected or not can be detected by the server. Then, when the opponent is being connected, information (address) for connecting to the opponent can be obtained by receiving a response from the server. Accordingly, even if the user makes a short distance wireless communication with a friend to exchange and register the identifying information and then is parted from the friend, the user can communicate with the friend across the network.

In another aspect, each game apparatus further comprises an opponent input means for obtaining opponent identifying information input through an operation by a user. The registering means stores the opponent identifying information taken by the opponent input means in the second storing means.

More specifically, the opponent input means (S289) obtains the identifying information of other game apparatus input by a user or a player. The registering means (S293) stores the input opponent identifying information in the second storing means (48, 28b, 80). It is possible to register the identifying information of the opponent by inputting it by hand. Thus, by exchanging the identifying information and manually registering it, it is possible to communicate over a network with a friend who cannot see because he lives in a distant place and a friend who cannot make a short-distance wireless communication.

In another aspect, a sever is further provided on the network. Each game apparatus further comprises a notifying means and a registered opponent transmitting means. The notifying means transmits to the server a notification including its own identifying information and indicative of being connected to the network. The registered opponent transmitting means transmits the opponent identifying information stored in the second storing means to the server. The server comprises an on-line machine list storing means, a registered opponent storing means, a second detecting means, and a responding means. The on-line machine list storing means stores in a third storing means at least its own identifying information and an address of the game apparatus being connected to the network on the basis of the notification. The registered opponent storing means stores in a fourth storing means the opponent identifying information received from the game apparatus for each game apparatus. The second detecting means, when the opponent identifying information is received, determines whether or not the received opponent identifying information is stored in the third storing means, and the identifying information of the game apparatus which has transmitted the opponent identifying information is stored in the fourth storing means as the opponent identifying information for the game apparatus corresponding to the opponent identifying information. The responding means, when by the second detecting means, the received opponent identifying information is stored in the third storing means, and the identifying information of the game apparatus which has transmitted the opponent identifying information is stored in the fourth storing means as the opponent identifying information for the game apparatus corresponding to the opponent identifying information, transmits the address of the game apparatus corresponding to the opponent identifying information to the game apparatus which has transmitted the opponent identifying information. The determining means determines whether or not, on the basis of the received data from the server, the other game apparatus corresponding to the opponent identifying information stored in the second storing means is being connected to the network, and its own identifying information is registered as the opponent identifying information of the other game apparatus. The first communication means makes a network communication over a network with the other game apparatus on the basis of the address received from the server when it is determined by determining means that the other game apparatus corresponding to the opponent identifying information is being connected to the network, and its own identifying information is registered as the opponent identifying information of the other game apparatus.

More specifically, a communication game system includes a server (72) which provided on the network, that is, which is connectable over the network. The notifying means (42, S67, S71, S171) of the game apparatus transmits to the server a notification including its own identifying information and indicative of being connected to the network. In the non-limiting example implementation described later, the notifying data includes an ID, a player name, a connection address, a game name, etc., and is transmitted at every fixed time period, for example. The on-line machine list storing means (S203) of the server is managed on the basis of the notification, for example, and stores in the third storing means (84) at least the its own identifying information and an address of the game apparatus being connected to the network. In the non-limiting example implementation described later, the on-line machine list data including an ID of a game apparatus being connected, a player name, a connection address, a game name, etc. is stored. Thus, the server manages information of a game apparatus being connected to the network. The registered opponent transmitting means (42, 64, S77, S301) of the game apparatus transmits the registered opponent identifying information to the server. The inquiry data including the entire opponent identifying information stored in the second storing means may be transmitted. The registered opponent storing means (S321) of the server stores in a fourth storing means (84) the opponent identifying information received from the game apparatus for each game apparatus. In the non-limiting example implementation described later, the received opponent identifying information is stored as friend list data in the on-line machine list data for each game apparatus. Thus, the server also stores friend list data of the game apparatus which is being connected to the network. The second detecting means (S323-S329), when the opponent identifying information is received, determines whether or not the received opponent identifying information is stored in the third storing means, and the identifying information of the game apparatus which has transmitted the opponent identifying information is stored in the fourth storing means as the opponent identifying information for the game apparatus corresponding to the opponent identifying information. That is, it is determined whether or not the game apparatus corresponding to the opponent identifying information is being connected to the network, and the identifying information of the game apparatus which has transmitted the opponent identifying information is registered in the friend list data of the game apparatus corresponding to the opponent identifying information. The responding means (S331, S333, S337), when it is determined that the received opponent identifying information is stored in the third storing means, and the identifying information of the game apparatus which transmits the opponent identifying information is stored in the fourth storing means as the opponent identifying information for the game apparatus corresponding to the opponent identifying information, transmits the address of the game apparatus corresponding to the opponent identifying information to the game apparatus which has transmitted the opponent identifying information. In the non-limiting example implementation described later, when it is determined that the game apparatus corresponding to the received opponent identifying information is not being connected, or the identifying information of the game apparatus which has transmitted is not registered as the opponent identifying information for the game apparatus corresponding to the received opponent identifying information, the data indicating that it is impossible to communicate with the game apparatus corresponding to the opponent identifying information is transmitted. The determining means (42, S83, S303) of the game apparatus determines whether or not, on the basis of the received data from the server, the other game apparatus corresponding to the opponent identifying information stored in the second storing means is being connected to the network, and the its own identifying information is registered as the opponent identifying information of the other game apparatus. Thus, if the identifying information can be manually input, as a precondition for the network communication, it is requested that the identifying information has been registered for each other. By setting the condition like above, a network communication is made between only the friends who gives and takes the identifying information. Also, if one illegally obtains the identifying information of the opponent, it is possible to prevent the network communication from being made. The first communication means (42, 64, S93, S95, S305, S307) makes a network communication across a network on the basis of the address received from the server when the registered other game apparatus is being connected to the network, and its own identifying information is registered as the opponent identifying information for the other game apparatus. Thus, the identifying information of the game apparatus being connected to the network is managed by the server, and a friend list of each game apparatus is stored in the server. Accordingly, it is possible to determine whether or not the opponent registered by hand or by a short distance wireless communication is being connected to the server, and it is possible to determine whether or not its own identifying information is registered as the opponent identifying information for the opponent by the server. Then, when the network communication can be established with the opponent, the information (address) for connecting with the opponent can be obtained from the server. Thus, even if a friend lives so far that a player register the opponent's identifying information by hand, or if a player is departed from an opponent with whom a short-distance wireless communication has made, it is possible to communicate across the network.

In addition, in a further aspect, each game apparatus further comprises a first display means for displaying its own identifying information.

More specifically, the first display means (42, 50, 52, 60, 12, 14, S243-S247) of the game apparatus displays its own identifying information. The identifying information to be displayed, that is, the identifying information to be registered by hand may be encoded identifying information. In a case that the encoded identifying information is displayed, the registering means decrypts the obtained identifying information to register it. Since its own identifying information is displayed, each user can know the identifying information of his or her own game apparatus and inform a friend of the identifying information of his or her own game apparatus.

In another aspect, a first game apparatus out of the respective game apparatuses further comprises an introducing means for, in a case of being communicated with a second game apparatus across a network, when receiving a communication connection from a third game apparatus, transmitting the opponent identifying information corresponding to the second game apparatus to the third game apparatus, and transmitting the opponent identifying information corresponding to the third game apparatus to the second game apparatus.

More specifically, the first game apparatus can introduce its own communicating opponents (second game apparatus and third game apparatus) to each other by the introducing means (42, S117, S119, S121). Thus, the first game apparatus can provide identifying information of one opponent to another opponent who does not register it, and therefore, the second game apparatus and the third game apparatus can make a network communication with an opponent with whom the second game apparatus and the third game apparatus has not communicated near them, or with a friend of a friend with whom they have not been acquainted, for example. Accordingly, it is possible to widen a range of the opponent with whom a communication can be made in the network communication.

Further, in the other aspect, a first game apparatus out of the respective game apparatuses further comprises a third communication means for, in a case of being communicated with a second game apparatus across a network, when receiving the opponent identifying information corresponding to a third game apparatus from the second game apparatus, and making a network communication with the third game apparatus.

More specifically, the first game apparatus can obtain identifying information of other game apparatus (third game apparatus) from the communicating opponent (second game apparatus) by the third communication means (42, 64, S97, S99, S101, S103), and can communicate with the introduced other game apparatus across a network. Accordingly, each game apparatus can make a network communication with an opponent with whom each game apparatus has not communicated near it, or with a friend of a friend with whom they have not been acquainted, for example. Thus, it is possible to widen a circle of the opponent with whom a communication can be made in the network communication.

In addition, in a further aspect, the first game apparatus further comprises a registration determining means and an additionally registering means. The registration determining means determines whether or not the opponent identifying information corresponding to the third game apparatus which makes a network communication by the third communication means is to be stored in the second storing means. The additionally registering means additionally registers the opponent identifying information corresponding to the third game apparatus in the second storing means when the registration determining means determines it is to be stored.

More specifically, the registration determining means (42, S105, S107) of the first game apparatus determines whether or not identifying information of other game apparatus with which a communication is made by the third communication means, that is, introduced by the communicating opponent is registered in the second storing means. In the non-limiting example implementation described later, it is determined whether or not the identifying information has already been registered in the friend list data. If it is not registered, it is determined whether or not the identifying information is added to the friend list according to the player's operation, for example. The additionally registering means (42, S109), when it is determined that the identifying information is registered, adds the identifying information to the friend list data of the second storing means. Accordingly, if each apparatus makes a communication over a network through introduction with an opponent with which the identifying information has not been exchanged with each other, whether or not the identifying information of the opponent is registered in the friend list is selectable, and therefore, it is possible to register only the identifying information of the opponent which is desired by a player, for example.

In another aspect, each game apparatus further comprises a communication method selecting means for selecting between making a network communication by the first communication means and making a short-distance wireless communication by the second communication means.

More specifically, it is possible to select between the short-distance wireless communication and the network communication by the communication method selecting means (42, S7-S13, S17, S19). In the non-limiting example implementation described later, it is possible to select a communication method depending on the presence or absence of the wireless LAN access point, the presence or absence of the friend list, and a player's operation. Thus, it is possible to selectively execute a communication with a nearby opponent and a communication with a distant opponent.

A game apparatus of a second exemplary illustrative non-limiting implementation is a game apparatus utilized in a communication game system in which a plurality of game apparatuses communicate across a network. The game apparatus comprises a first storing means, a registering means, a network connecting means, a determining means, and a first communication means. The first storing means stores its own identifying information. The registering means registers opponent identifying information being the identifying information of other game apparatus. The network connecting means connects to an access point to allow an access to a network for performing a network communication. The determining means determines whether or not a network communication is allowable with the other game apparatus corresponding to the opponent identifying information registered by the registering means when the network connecting means connects to the network via the access point. The first communication means makes a network communication with the other game apparatus about which a network communication is allowable is determined by the determining means.

The second exemplary illustrative non-limiting implementation is a game apparatus utilized in the above-described communication game system, allows a network communication with only the friend whose identifying information is registered by a short- distance wireless communication or by hand, and allows a network communication with a fried of a friend introduced by the friend similarly to the above-described first invention. Accordingly, it is possible to realize a network game easy for anyone to participate in.

A storage medium storing a game program of a third exemplary illustrative non-limiting implementation is a storage medium storing a game program of a game apparatus which is utilized in a communication game system in which a plurality of game apparatuses communicate across a network, and is provided with a first storing means for storing at least its own identifying information. The game program of the storing medium causes a processor of the game apparatus to execute a registering step, a network connecting step, a determining step, and a first communication step. The registering step registers opponent identifying information being the identifying information of other game apparatus. The network connecting step connects to an access point to allow an access to a network for performing a network communication. The determining step determines whether or not a network communication is allowable with the other game apparatus corresponding to the opponent identifying information registered by the registering step when the network connecting step connects to the network via the access point. The first communication step makes a network communication with the other game apparatus about which a network communication is allowable is determined by the determining step.

The third exemplary illustrative non-limiting implementation is a storage medium storing a game program of a game apparatus to be utilized in a communication game system described above, and has an advantage similarly to the above-described first invention and second invention.

A server of a fourth exemplary illustrative non-limiting implementation is a server which is utilized in a communication game system in which a plurality of game apparatuses communicate across a network. Each game apparatus includes a first storing means for storing its own identifying information and a second storing means for storing opponent identifying information as the identifying information of other game apparatus. The server comprises an on-line machine list storing means, a registered opponent storing means, a second detecting means, and a responding means. The on-line machine list storing means stores in a third storing means at least its own identifying information and an address received from the game apparatus being connected to the network. The registered opponent storing means stores in a fourth storing means the opponent identifying information received from the game apparatus for each game apparatus. The second detecting means, when the opponent identifying information is received, determines whether or not the received opponent identifying information is stored in the third storing means, and the identifying information of the game apparatus which has transmitted the opponent identifying information is stored in the fourth storing means as the opponent identifying information for the game apparatus corresponding to the opponent identifying information. The responding means, when by the second detecting means, it is determined that the opponent identifying information is stored in the third storing means, and the identifying information of the game apparatus which has transmitted the opponent identifying information is stored in the fourth storing means as the opponent identifying information for the game apparatus corresponding to the opponent identifying information, transmits the address of the game apparatus corresponding to the opponent identifying information to the game apparatus which has transmitted the opponent identifying information.

More specifically, the server is utilized in a communication game system as described above in which a plurality of game apparatuses makes a communication across a network. Each game apparatus stores its own identifying information in the first storing means, and stores the opponent identifying information in the second storing means similarly to the above-described first invention. The server is applied when the opponent identifying information can be registered by input by player's hand operation in each game apparatus. The on-line machine list storing means (S203) of the server stores in the third storing means (84) at least its own identifying information and an address which are received from the game apparatus being connected to the network. That is, the server manages the identifying information of the game apparatus being connected to the network. In the non-limiting example implementation described later, the on-line machine list data including a connection address, a player name, etc. in corresponding to the identifying information of the game apparatus is stored. The registered opponent storing means (S321) stores in a fourth storing means (84) the opponent identifying information received from the game apparatus for each game apparatus. That is, the server stores a friend list of each game apparatus. In the non-limiting example implementation described later, the opponent identifying information is stored in correspondence with the identifying information of the game apparatus which the opponent identifying information has transmitted in the on-line machine list data. The second detecting means (S323-S329), when the opponent identifying information is received, determines whether or not the received opponent identifying information is stored in the third storing means, and the identifying information of the game apparatus which has transmitted the opponent identifying information is stored in the fourth storing means as the opponent identifying information for the game apparatus corresponding to the opponent identifying information. That is, it is determined whether or not the game apparatus corresponding to the opponent identifying information is being connected to the network, and the game apparatus corresponding to the opponent identifying information registers the identifying information of the game apparatus which has transmitted the opponent identifying information. The responding means (S331, S333, S337), when it is determined that the received opponent identifying information is stored in the third storing means, and the identifying information of the game apparatus which has transmitted the opponent identifying information is stored in the fourth storing means as the opponent identifying information for the game apparatus corresponding to the opponent identifying information, transmits the address of the game apparatus corresponding to the opponent identifying information to the game apparatus which has transmitted the opponent identifying information. That is, when it is determined that the game apparatus corresponding to the opponent identifying information and the game apparatus which has transmitted the opponent identifying information can be communicated across the network, the information for connecting to the game apparatus corresponding to opponent identifying information is sent back to the game apparatus which has transmitted the opponent identifying information. Also, when it is determined that the network communication is not allowable, the data indicating that a communication is impossible is sent back. Thus, the server manages the identifying information of the on-line game apparatus, and stores the friend list of each game apparatus. Then, when it is determined its own identifying information of the game apparatuses are registered in each other's game apparatuses, the information for connection is sent back. Thus, a network communication can be made between only the game apparatuses which have registered each other's identifying information. Thus, in a case that one illegally obtains the identifying information of the other opponent, and registers it by hand, or in a case that the opponent identifying information is legally exchanged by a short distance wireless communication or by a transmission, but one party denies a communication with the other party, and does not register the identifying information of the other party, or so, it is possible to prevent the network communication from being performed. Thus, since only when both of the game apparatuses store each other's identifying information, a communication is made over the network, capable of realizing a network game in which a player easily and freely participates.

A storage medium storing a communication processing program of a fifth exemplary illustrative non-limiting implementation is a storage medium storing a communication processing program of a server utilized in a game system in which a plurality of game apparatuses communicate across a network. Each game apparatus comprises a first storing means for storing its own identifying information and a second storing means for storing opponent identifying information as identifying information of the other game apparatus. The communication process program of the storing medium causes a processor of the server to execute an on-line machine list storing step, a registered opponent storing step, a second detecting step, and a responding step. The on-line machine list storing step stores in a third storing means at least its own identifying information and an address which are received from the game apparatus being connected to the network. The registered opponent storing step stores in a fourth storing means the opponent identifying information received from the game apparatus for each game apparatus. The second detecting step, when the opponent identifying information is received, determines whether or not the opponent identifying information is stored in the third storing means, and the identifying information of the game apparatus which has transmitted the opponent identifying information is stored in the fourth storing means as the opponent identifying information for the game apparatus corresponding to the opponent identifying information. The responding step, when by the second detecting step, it is determined that the opponent identifying information is stored in the third storing means, and the identifying information of the game apparatus which has transmitted the opponent identifying information is stored in the fourth storing means as the opponent identifying information for the game apparatus corresponding to the opponent identifying information, transmits the address of the game apparatus corresponding to the opponent identifying information to the game apparatus which has transmitted the opponent identifying information.

The fifth exemplary illustrative non-limiting implementation is a storage medium storing a program corresponding to the server of the above-described fourth invention, and has an advantage similar to the above-described fourth invention.

A game control method of a sixth exemplary illustrative non-limiting implementation is a game control method of a game apparatus which is utilized in a communication game system in which a plurality of game apparatuses communicate across a network, and is provided with a first storing means storing at least its own identifying information. The game control method includes a registering step, a network connecting step, a determining step, and a first communication step. The registering step registers opponent identifying information being the identifying information of other game apparatus. The network connecting step connects to an access point to allow an access to a network for performing a network communication. The determining step determines whether or not a network communication is allowable with the other game apparatus corresponding to the opponent identifying information registered by the registering step when the network connecting step connects to the network via the access point. The first communication step makes a network communication with the other game apparatus about which a network communication is allowable is determined by the determining step.

A game control method of the sixth exemplary illustrative non-limiting implementation has an advantage similarly to a storage medium storing a game program of the above-described third invention.

A communication game control method of a seventh exemplary illustrative non-limiting implementation is a communication game control method of a server which is utilized in a communication game system in which a plurality of game apparatuses each of which has a first storing means for storing its own identifying information and a second storing means for storing opponent identifying information as the identifying information of other game apparatus communicate across a network. The communication game control method includes an on-line machine list storing step, a registered opponent storing step, a second detecting step, and a responding step. The on-line machine list storing step stores in a third storing means at least its own identifying information and an address which are received from the game apparatus being connected to the network. The registered opponent storing step stores in a fourth storing means the opponent identifying information received from the game apparatus for each game apparatus. The second detecting step, when the opponent identifying information is received, determines whether or not the received opponent identifying information is stored in the third storing means, and the identifying information of the game apparatus which has transmitted the opponent identifying information is stored in the fourth storing means as the opponent identifying information for the game apparatus corresponding to the opponent identifying information. The responding step, when by the second detecting step, it is determined that the received opponent identifying information is stored in the third storing means, and the identifying information of the game apparatus which has transmitted the opponent identifying information is stored in the fourth storing means as the opponent identifying information for the game apparatus corresponding to the opponent identifying information, transmits the address of the game apparatus corresponding to the opponent identifying information to the game apparatus which has transmitted the opponent identifying information.

A communication game control method of the seventh exemplary illustrative non-limiting implementation has an advantage similarly to a storage medium storing a communication processing program of the above-described fifth invention.

According to the present invention, when the identifying information of other game apparatus is registered, if it is determined that a network communication is allowable with a game apparatus corresponding to the registered identifying information, a network communication is made with the opponent. Thus, since a network communication is made between only the opponents whose identifying information are registered, it is possible to realize a network game in which the player easily participates.

If the identifying information is exchanged between the opponents by a short distance wireless communication and registered, and then, a connection is made with a network such as the Internet to obtain a determination that the opponent is being connected on the basis of the identifying information via the server, for example, a communication is made with the opponent. Accordingly, a network communication is made with an opponent with whom the identifying information is exchanged, so that even if the user makes a short distance wireless communication with a friend and then is parted from the friend, the user can communicate with the friend across the network.

In a case that the player registers the identifying information of the opponent by hand, if the opponent also registers the player's identifying information, it is determined that communication is allowable with the opponent over the network. Accordingly, by exchanging and registering the identifying information with a friend or an acquaintance with whom the user does not directly meet, it becomes possible to communicate across a network.

Also, in the network communication, other opponent being communicated is introduced to a communicating opponent. Thus, it is possible to widen a range of the opponent with whom a communication can be made in the network communication, and by registering the identifying information of the introduced opponent, a circle of friends can be widened.

Thus, since an opponent of the network communication starts from a nearby opponent which performs a short-distance communication or an acquaintance to whom identifying information can be transmitted, and gradually widens to a friend of a friend, this allows the user to participate in the network game safely and freely. Thus, it is possible to realize a network game in which general game users who avoid participating in the network game can easily participate.

The above described, features, aspects and advantages of the exemplary illustrative non-limiting implementation will become more apparent from the following detailed description of the present invention when taken in conjunction with the accompanying drawings.

BRIEF DESCRIPTION OF THE DRAWINGS

FIG. 6 is an illustrative view showing one exemplary illustrative non-limiting implementation of a memory map of a server;

FIG. 9 is an illustrative view showing one exemplary illustrative non-limiting implementation of a communicable range selecting screen, FIG. 9(A) shows a screen to be displayed when a network game is executable, and FIG. 9(B) shows a screen to be displayed when a network game is not executable;

FIG. 27 is an illustrative view showing one exemplary illustrative non-limiting implementation of a memory map of a server of another example implementation;

DETAILED DESCRIPTION OF THE INVENTION

Figure 1:
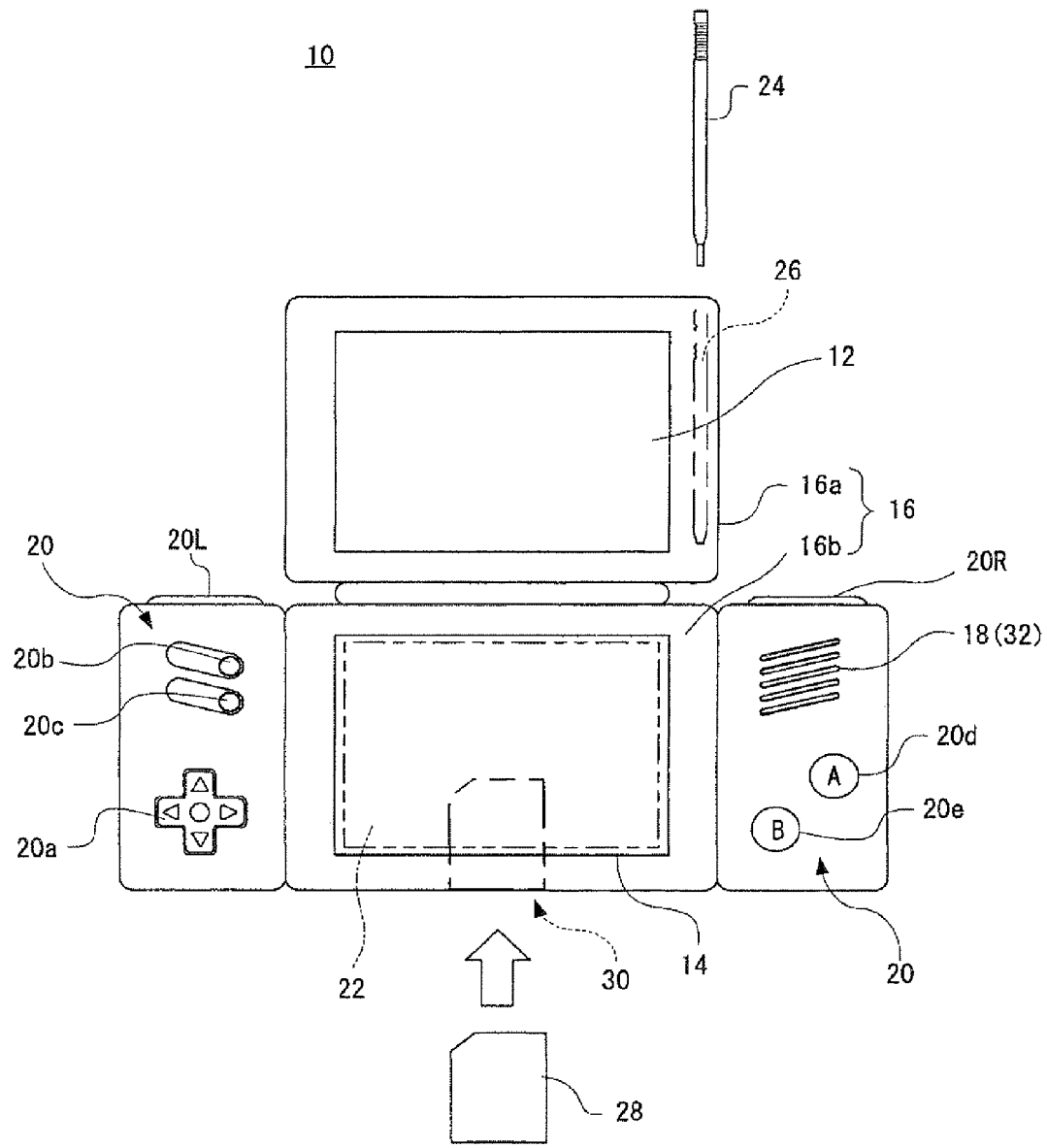
FIG. 1 is an appearance view showing one exemplary illustrative non-limiting implementation of a game apparatus utilized in a communication game system.

Referring to FIG. 1, a game apparatus 10 of one exemplary illustrative non-limiting implementation includes a first liquid crystal display (LCD) 12 and a second LCD 14. The LCD 12 and the LCD 14 are provided on a housing 16 so as to be arranged in a predetermined position in the housing. In this non-limiting example implementation, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It should be noted that although the LCD is utilized as a display in this non-limiting example implementation, an EL (Electronic Luminescence) display and a plasma display may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the tower housing 16b has a plane shape horizontally longer than the upper housing 16a, and has an opening formed so as to expose a display surface of the LCD 14 at an approximately center of the horizontal direction. Furthermore, the lower housing 16b is provided with a sound hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b at a place except for a connected portion with the upper housing 16a, and lie of each side of the connected portion.

The direction instructing switch 20a functions as a digital joystick, and is utilized for instructing a moving direction of a player character (or player object) to be operated by a player and a cursor, and so forth by operating any one of four depression portions. The start switch 20b is formed by a push button, and is utilized for starting (restarting), temporarily stopping a game, and so forth. The select switch 20c is formed by the push button, and utilized for a game mode selection, etc.

The action switch 20d, that is, the A button is formed by the push button, and allows the player character to perform an arbitrary movement (action), except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20e, that is, the B button is formed by the push button, and is utilized for changing a game mode selected by the select switch 20c, canceling an action determined by the A button 20d, and so forth.

The action switch (left depression button) 20L and the action switch (right depression button) 20R are formed by the push button, and the left depression button (L button) 20L and the right depression button (R button) 20R can perform the same operation as the A button 20d and the B button 20e, and also function as a subsidiary of the A button 20d and the B button 20e.

Also, on a top surface of the LCD 14, a touch panel 22 is provided. As the touch panel 22, any one of kinds of a resistance film system, an optical system (infrared rays system) and an electrostatic capacitive coupling system, for example, can be utilized. In response to an operation by depressing, stroking, touching, hitting, and so forth with a stick 24, a pen (stylus pen), or a finger (hereinafter, referred to as "stick 24, etc.") on a top surface of the touch panel 22, the touch panel 22 detects a coordinates position operated by the stick 24, etc. (that is, touched) to output coordinates data corresponding to the detected coordinates.

It should be noted that in this non-limiting example implementation, a resolution of the display surface of the LCD 14 is 256 dots.times.192 dots, and a detection accuracy of a detection surface (operation surface) of the touch panel 22 is also rendered 256 dots.times.192 dots in correspondence to the resolution of the display surface (this is true for the LCD 12). However, in FIG. 1, in order to simply represent the touch panel 22, the touch panel 22 is displayed different from the LCD 14 in size, but the display screen of the LCD 14 and the operation screen of the touch panel 22 are the same in size. It should be noted that the detection accuracy of the touch panel 22 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, characters such as a map, a player character, etc. are displayed on the one LCD, and items belonging to the player character may be displayed on the other LCD. Furthermore, a game play screen may be displayed on the one LCD (LCD 12 in this non-limiting example implementation), and a game screen (operation screen) including an image such as textual information, an icon, etc. for operating the game may be displayed on the other LCD (LCD 14 in this non-limiting example implementation). Furthermore, by utilizing the two LCD 12 and LCD 14 as one screen, it is possible to display a large monster (enemy character) to be defeated by the player character.

Accordingly, the player is able to point a character image such as a player character, an enemy character, an item character, texture information, an icon, etc. to be displayed on the LCD 14 and select commands by operating the touch panel 22 with the use of the stick 24, etc.

It should be noted that depending on the kind of the game, the player is able to use the LCD 14 for another various input instructions, such as selecting or operating the icon displayed on the LCD 14, instructing a coordinate input, and so forth.

Thus, the game apparatus 10 has the LCD 12 and the LCD 14 as a display portion of two screens, and by providing the touch panel 22 on an upper surface of any one of them (LCD 14 in this non-limiting example implementation), the game apparatus 10 has the two screens (12, 14) and the operating portions (20, 22) of two systems.

Furthermore, in this non-limiting example implementation, the stick 24 can be inserted into a housing portion (housing slot) 26 provided in proximity to a side surface (right side surface) of the upper housing 16a, for example, and taken out therefrom as necessary. It should be noted that in a case of preparing no stick 24, it is not necessary to provide the housing portion 26.

Also, the game apparatus 10 includes a memory card (or game cartridge) 28. The memory card 28 is detachable, and inserted into a loading slot 30 provided on a rear surface or a lower edge (bottom surface) of the lower housing 16b. Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

It should be noted that although not illustrated in FIG. 1, a speaker 32 (see FIG. 2) is provided at a position corresponding to the sound release hole 18 inside the lower housing 16b.

Furthermore although omitted in FIG. 1, for example, a battery accommodating box is provided on a rear surface of the lower housing 16b, and a power switch, a volume switch, an external expansion connector, an earphone jack, etc. are provided on a bottom surface of the lower housing 16b.

Figure 2:
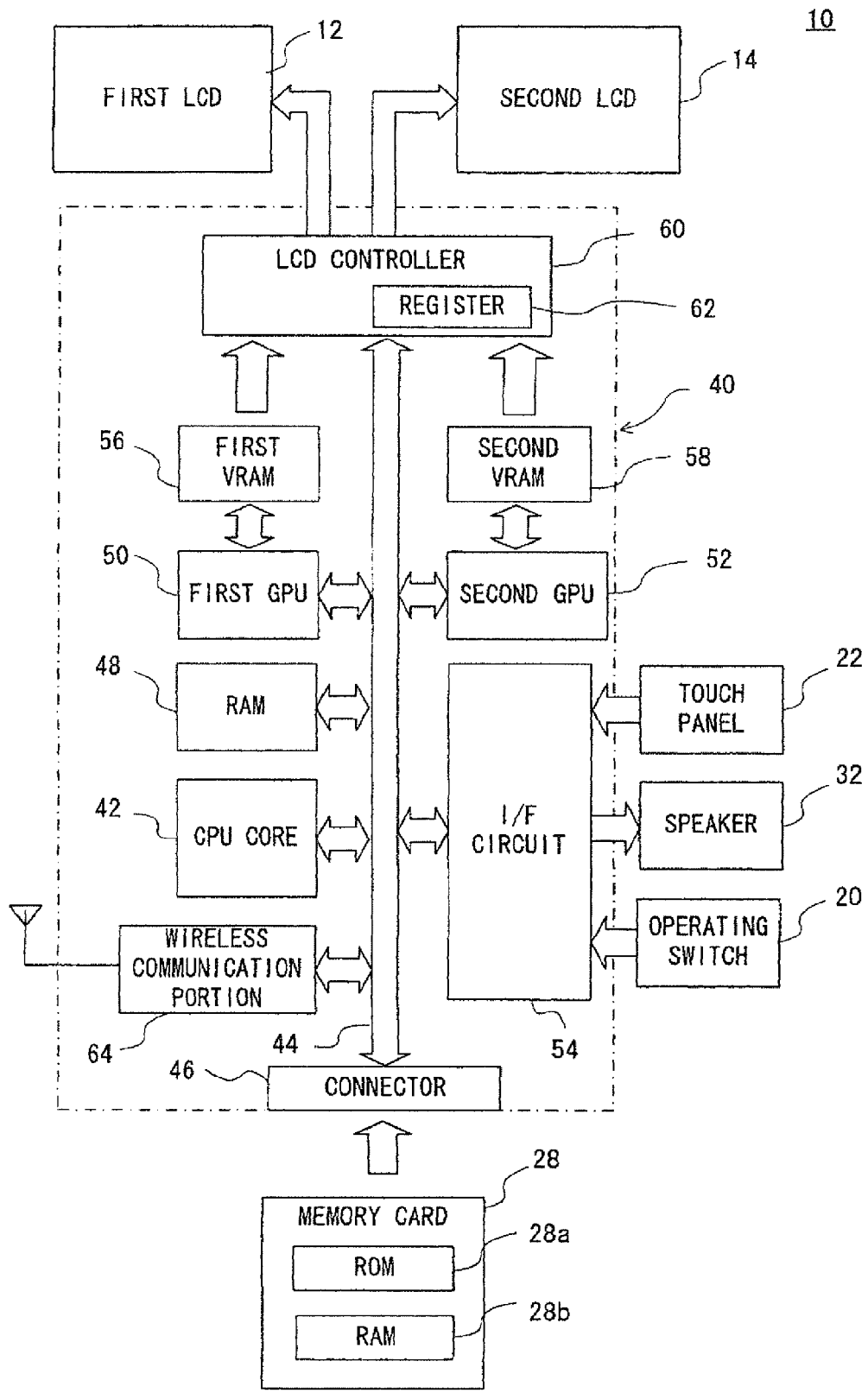
FIG. 2 is a block diagram showing an electric configuration of the game apparatus shown in FIG. 1.

FIG. 2 is a block diagram showing an electrical configuration of the game apparatus 10. Referring to FIG. 2, the game apparatus 10 includes an electronic circuit board 40, and on the electronic circuit board 40, a circuit component such as a CPU core 42, etc. is mounted. The CPU core 42 is connected to the connector 46 via a bus 44, and is connected with a RAM 48, a first graphics processing unit (GPU) 50, a second GPU 52, and an input-output interface circuit (hereinafter, referred to as "I/F circuit") 54, an LCD controller 60, and a wireless communication portion 64.

The connector 46 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 46. Accordingly, the CPU core 42 gains access to the ROM 28a and the RAM 28b as described above.

The ROM 28a stores in advance a game program for a game (virtual game) to be executed by the game apparatus 10, image data (character image, background image, item image, icon (button) image, message image, cursor image etc.), data of the sound (music) necessary for the game (sound data), etc. The RAM (backup RAM) 28b stores (saves) proceeding data and result data of the game.

The RAM 48 is utilized as a buffer memory or a working memory. That is, the CPU core 42 loads the game program, the image data, the sound data, etc. stored in the ROM 28a of the memory card 28 into the RAM 48, and executes the loaded game program. The CPU core 42 executes a game process while storing data (game data, flag data, etc.) generated or obtained in correspondence with a progress of the game in the RAM 48.

It should be noted that the game program, the image data, the sound data, etc. are loaded from the ROM 28*a* entirely at a time, or partially and sequentially as necessary so as to be stored into the RAM 48.

However, a program as to an application except for the game and image data required to execute the application may be stored in the ROM 28*a* of the memory card 28. In addition, sound (music) data may be stored therein as necessary. In such a case, in the game apparatus 10, the application is executed.

Each of the CPU 50 and the GPU 52 forms a part of a rendering means, is constructed by, for example, a single chip ASIC, and receives a graphics command (construction command) from the CPU core 42 to generate game image data according to the graphics command. It should be noted that the CPU core 42 applies an image generation program (included in the game program) to both of the CPU 50 and CPU 52.

Furthermore, the GPU 50 is connected with a first video RAM (hereinafter referred to as "VRAM") 56, and the GPU 52 is connected with a second VRAM 58. The GPU 50 and the GPU 52 respectively access the first VRAM 56 and the second VRAM 58 to obtain necessary data (image data: character data, texture data, etc.) necessary for executing the graphics command. It should be noted that the CPU core 42 reads image data necessary for rendering from the RAM 48, and writes it to the first VRAM 56 and the second VRAM 58. The GPU 50 accesses the VRAM 56 to generate game image data for display, and stores it in a rendering buffer in the VRAM 56. The GPU 52 accesses the VRAM 58 to create game image data for display, and stores the image data in a rendering buffer of the VRAM 58. A flame buffer or a line buffer may be employed as a rendering buffer.

The VRAM 56 and the VRAM 58 are connected to the LCD controller 60. The LCD controller 60 includes a register 62, and the register 62 consists of, for example, one bit, and stores a value of "0" or "1" (data value) according to an instruction of the CPU core 42. The LCD controller 60 outputs the game image data created by the GPU 50 to the LCD 12, and outputs the game image data created by the CPU 52 to the LCD 14 in a case that the data value of the register 62 is "0". On the other hand, the LCD controller 60 outputs the game image data created by the GPU 50 to the LCD 14, and outputs the game image data created by the GPU 52 to the LCD 12 in a case that the data value of the register 62 is "1".

It should be noted that the LCD controller 60 can directly read the game image data from the VRAM 56 and the VRAM 58, or read the game image data from the VRAM 56 and the VRAM 58 via the CPU 50 and the GPU 52.

Also, the VRAM 56 and the VRAM 58 may be provided in the RAM 48, or the rendering buffer and a Z buffer may be provided in the RAM 48.

The I/F circuit 54 is connected with the operating switch 20, the touch panel 22 and the speaker 32. Here, the operating switch 20 is the above-described switches 20*a*, 20*b*, 20*c*, 20*d*, 20*e*, 20L and 20R, and in response to an operation of the operating switch 20, a corresponding operation signal (operation data) is input to the CPU core 42 via the I/F circuit 54. Furthermore, operation data output from the touch panel 22 (coordinates data) is input to the CPU core 42 via the I/F circuit 54. In addition, the CPU core 42 reads from the RAM 48 the sound data necessary for the game such as a game music (BGM), a sound effect or voices of a game character (onomatopoeic sound), etc., and outputs it from the speaker 32 via the I/F circuit 54.

The wireless communication portion 64 is a communication means for wirelessly sending and receiving data with other game apparatus 10 or communications equipment. The wireless communication portion 64 modulates communication data to be transmitted to the opponent into a radio signal to send it from an antenna, and receives a radio signal from the opponent by the same antenna to demodulate it to communication data. Via the wireless communication portion 64, the game apparatus 10 sends and receives data with other game apparatus 10 to execute a communication game. The wireless communication portion 64 is compatible with IEEE 802.11 (Wi-Fi), for example, and can send and receive data with other game apparatus 10 and communications equipment by a wireless LAN. The game apparatus 10 may execute a communication game with other nearby game apparatus 10, for example, by the wireless LAN. Also, the game apparatus 10 can send and receive data with other computer, server, and game apparatus 10, etc. over the Internet by utilizing the TCP/IP Protocol. Accordingly, the game apparatus 10 can access an Internet service provider (ISP) through a wireless LAN access point, such as a household LAN, a public wireless LAN, or the like so as to be connected to a network such as, the Internet or the WAN (Wide Area Network) via the ISP. This allows a game apparatus 10 to play a communication game with other game apparatus 10 which is connected to the Internet away from the game apparatus 10.

It should be noted that although a description is made on a case that the wireless communication portion 64 works according to a wireless LAN standard in this non-limiting example implementation, this may work according to another wireless communication standard such as Bluetooth, for example, in another non-limiting example implementation.

Also, the wireless communication portion 64 can execute a wireless communication on the basis of a time division multiple access system, for example. The communication game with other nearby game apparatus 10 may be executed by the wireless communication system. For example, each game apparatus 10 is assigned a time slot during one communication cycle, and by the assigned slot, it's own data is transmitted. It should be noted that for more information, a technique of such a wireless communication is described in detail in Japanese Patent Publication No. 2004-135778 and 2004-136009 by the present applicant.

A communication game system of this non-limiting example implementation comprises a plurality of game apparatuses 10 as described above. In the communication game system, even in a short-distance communication shown in FIG. 3, even in a long-distance communication shown in FIG. 4, a communication game is executed among a plurality of game apparatuses 10.

Figure 3:
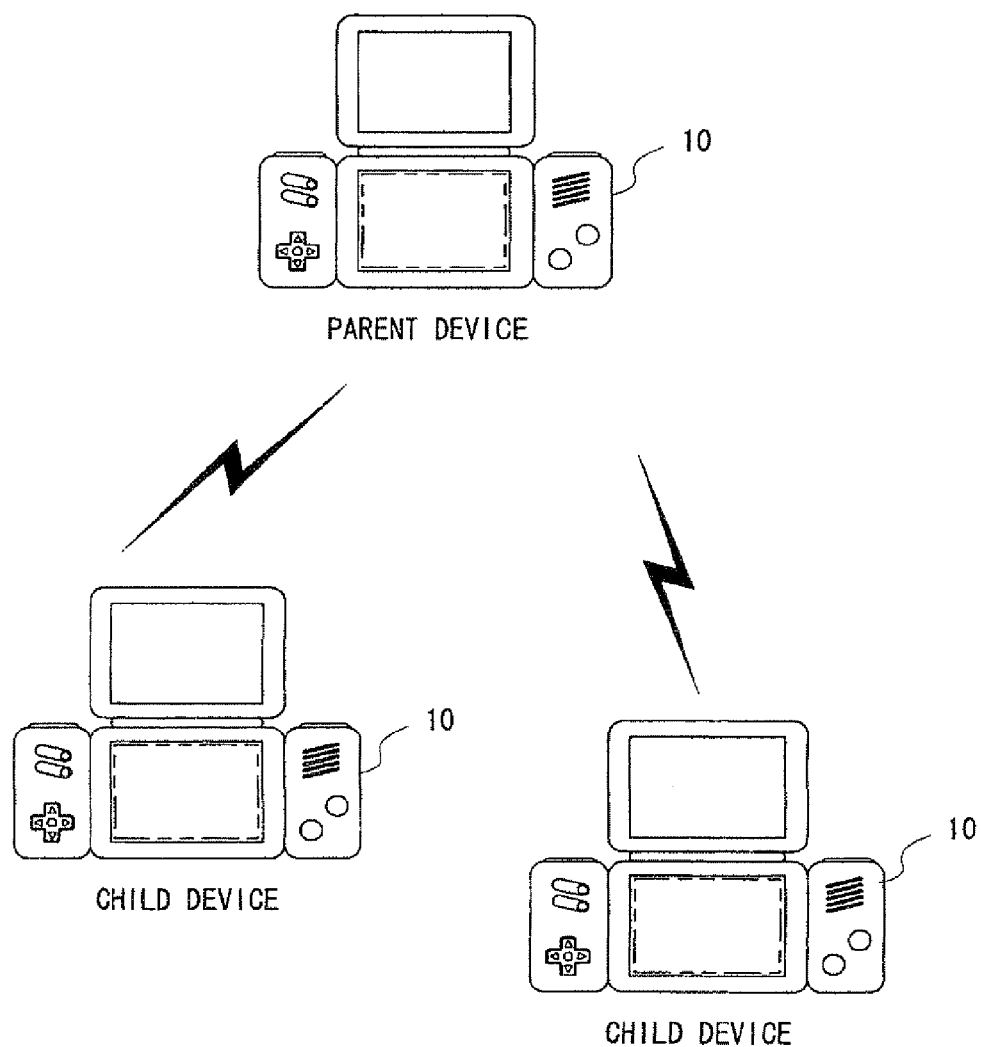
FIG. 3 is an illustrative view showing one exemplary illustrative non-limiting implementation of a communication game system the instance where a communication game is executed via a short distance wireless communication using the game apparatus of FIG. 1.

First, as shown in FIG. 3, if a plurality of game apparatuses 10 exist close to one another, the communication game is executed by a short-distance wireless communication among the plurality of game apparatuses 10. For example, one apparatus out of the plurality of game apparatuses 10 functions as a parent device, the others function as a child device, so that, data is sent and received between the parent device and the child device. Each player selects whether or not his own apparatus becomes a parent device or a child device on a selection screen, for example. If a game apparatus 10 functions as a parent device, the game apparatus 10 searches a child device existing within a communicable range to connect it, and if the game apparatus 10 functions as a child device, it searches a parent device capable of participating in the communication game which exists within a communicable range to connect it.

If the communication game is performed by the short-distance wireless communication, the identifying information of the game apparatuses 10 are exchanged among the plurality of game apparatuses 10 automatically or in accordance with a selecting operation of each player. That is, each game apparatus 10 can obtain the identifying information of opponent's game apparatus 10 which participates in the communication game in the short-distance communication game. For example, since such the communication game performed within a short-distance range is assumed to be played among friends, respective players come together to play the communication game and can obtain identifying information of friend's game apparatus 10. The obtained identifying information of the other game apparatus 10 is stored as friend list data.

The identifying information obtained by the communication game within a short-distance range is identifying information to be utilized for the communication game within a long-distance range. Accordingly, the player who obtained the identifying information of the opponent by the communication game within a short-distance range, and then is parted from the opponent, can perform a communication game by making a communication via the Internet, or the like.

Figure 4:
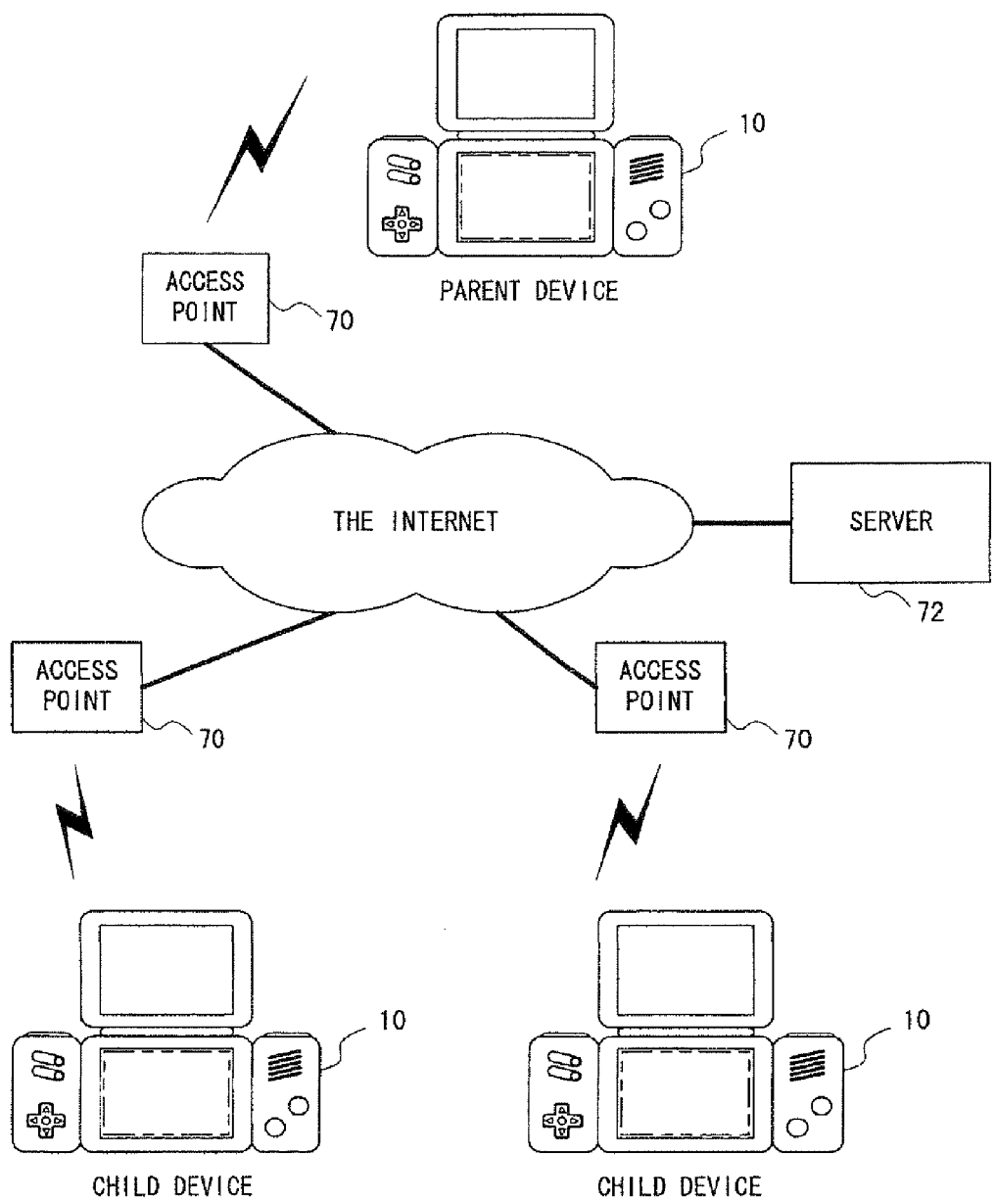
FIG. 4 is an illustrative view showing one exemplary illustrative non-limiting implementation of the communication game system in the instance where a communication game is executed via landline network communication the game apparatus of FIG. 1.

As shown in FIG. 4, the communication game within the long-distance range is executed among a plurality of game apparatuses 10 over the network such as the Internet, or the like. For example, each game apparatus 10 accesses the Internet via each access point 70 such as a wireless LAN access point. Also, in this non-limiting example implementation, the communication game system includes a server 72 on the Internet, and the server 72 functions as a matching server of each game apparatus 10. The server 72 is a computer, includes a CPU, a memory, communication equipment for network communication, etc., and operates according to a program stored in the memory.

For example, the game apparatus 10 connects to the server 72 via the access point 70, and transmits to the server 72 notifying data including its own identifying information and indicating that it is on line (being connected or being communicated). The server 72 receives the notifying data to thereby know that the game apparatus 10 corresponding to the identifying information is being connected. The server 72 stores the received identifying information as on-line machine list data. Transmission of the notifying data by the game apparatus 10 is executed at a predetermined time period, for example. The server 72 can know that the game apparatus 10 is off line on the basis of absence of reception of the notifying data, and updates the on-line machine list data.

Then, the game apparatus 10 transmits inquiry data including identifying information of the friend list to the server 72, and inquires whether or not other game apparatus 10 corresponding to the identifying information is being connected to the server 72. The server 72 determines whether or not the inquired identifying information is present in the on-line machine list. If it is determined that other game apparatus is being connected the server 72, the server transmits a response to the game apparatus 10 who has made an inquiry about the connection address of the relevant game apparatus 10. Accordingly, if the game apparatus 10 receives inquiry result data indicating that the opponent's game apparatus 10 is being connected, the game apparatus 10 connects to the opponent's game apparatus 10 on the basis of the connection address of the opponent obtained from the received data to thereby execute a communication game.

Figure 5:
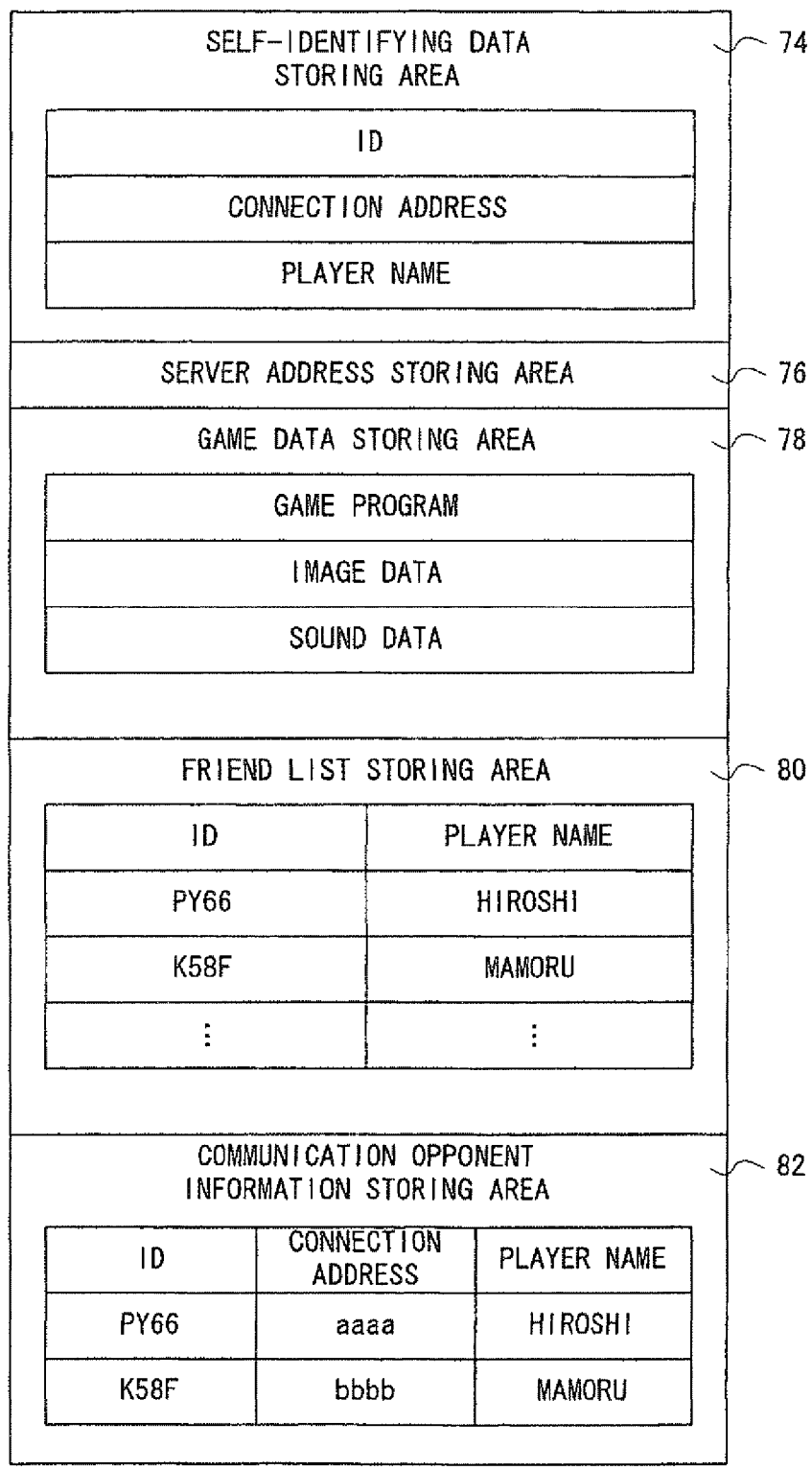
FIG. 5 is an illustrative view showing one exemplary illustrative non-limiting implementation of a memory map of a RAM of the game apparatus.

FIG. 5 shows one example of a memory map of the RAM 48 of the game apparatus 10. The RAM 48 includes a self-identifying data storing area 74, a server address storing area 76, a game data storing area 78, a friend list storing area 80, a communication opponent information storing area 82, etc. It should be noted that only a part of the memory map is shown in FIG. 5, and the RAM 48 stores various data necessary for advancing the game.

In the self-identifying data storing area 74, information, such as self-ID, a connection address, a player name, etc. is stored. The ID is identifying information of a game apparatus 10 in the communication game. The ID may be stored in advance in the ROM 28a of the memory card 28, a non-volatile memory included in the RAM 48 of the game apparatus 10, or the like.

However, in this non-limiting example implementation, in order to make a possessor of the memory card 28 or a possessor of the game apparatus 10 changeable at a time of change thereof, the ID is generated when the memory card 28 for the communication game is attached to the game apparatus 10, and the player name is set as an initial setting, for example. Or, the ID may be generated when possessor's name of the game apparatus 10 is set, and be stored in the non-volatile memory, etc. of the RAM 48. An ID setting method is arbitrary, but the ID needs to set to be a unique value or number. As one example, the ID may be generated by adding current time information at a time of generation of the ID to an MAC address of the wireless communication portion 64 functioning as an Ethernet (registered trademark) device of the game apparatus 10. The current time information may be obtained from a clock IC not shown, for example, to be connected to the CPU core 42.

Also, the connection address is an IP address when the game apparatus 10 utilizes in being connected to the Internet. The transmission data includes the connection address as a transmission source IP address. The connection address is a private IP address in this non-limiting example implementation. For example, the connection address is assigned by a DHCP (Dynamic Host Configuration Protocol) server function of the wireless LAN access point 70, obtained by a DHCP client function of the wireless communication portion 64, and stored in the RAM 48. Or, the connection address may manually be set by the player in the game apparatus 10. If an ISP which the player subscribes to or an ISP, etc. to which an access point 70 of the public wireless LAN is connected assigns a private IP address by a DHCP, or the like, a transmission source IP address of the transmission data is translated into a global IP address by a gateway of the ISP. On the other hand, if an ISP which the player subscribes to or an ISP, etc. to which an access point 70 of the public wireless LAN is connected assigns a global IP address by a DHCP or a PPPoE, or the like or delivers a fixed global IP address, the wireless LAN access point 70 translates a transmission source IP address of transmission data from a private address to a global address by utilizing an NAPT (Network Address Port Translation) or an IP masquerade function, and translates a port number also.

Also, the player name is input by a player's operation at an initial setting, for example. In the communication game, the game apparatus 10 receives the transmission data including the player name data to thereby display the player name of the opponent.

In the server address storing area 76, a global IP address, a port number, etc. of the server 72 or the computer managing the server 72 are stored. The server address may be stored in advance in the ROM 28a of the memory card 28, or may be input by a player's operation. If data is transmitted to the server 72, the server address is included in the transmission data as a destination IP address.

In the game data storing area 78, a game program for executing a communication game, image data for generating a game screen, sound data for outputting a sound, and etc. are stored.

In the friend list storing area 80, friend list data including identifying information of an opponent with which the player plays a communication game is stored. The friend list data includes information such as an ID of the opponent's game apparatus 10 and a player name of the opponent. The friend list data is generated according to a selecting operation by the player or automatically when a communication game is performed by a short-distance wireless communication. In addition, the friend list data can be added identifying information of the opponent who is introduced over the Internet communication (that is, a friend of a friend) according to a selecting operation by the player or automatically. The generated or updated friend list data is stored in the RAM 28b as a non-volatile memory of the memory card 28. If the friend list data has been stored in the RAM 28b of the memory card 28 at a start of the communication game, the data is read and stored in the friend list storing area 80.

In the communication opponent information storing area 82, information of the communicating opponent who makes a communication game or is being communicated through the Internet communication or a network communication is stored. The communicating opponent information includes an ID, a connection address, and a player name, etc. of the opponent's game apparatus 10. The connection address is a global IP address of the game apparatus 10 of the communicating opponent. The connection address of the communicating opponent already registered in the friend list is obtained from the server 72 in response to an inquiry, and stored. Also, if a friend is introduced from the communicating opponent by the Internet communication, information of the friend is obtained from the communicating opponent's game apparatus 10, and stored. When data is transmitted to the communicating opponent in the Internet communication game, the connection address is set to a destination IP address. The destination IP address of the transmission data is translated into the private IP address of the corresponding game apparatus 10 by the ISP, the wireless LAN access point 70, or the like, so that the transmission data is delivered to the game apparatus 10 of the communicating opponent.

FIG. 6 shows one example of a memory map of a memory of the server 72. The memory of the server 72 includes an on-line machine list storing area 84, etc. It should be noted that FIG. 6 shows only a part of the memory map of the server 72, and necessary various data are generated or obtained so as to be stored.

As to the on-line machine list data, information about the game apparatus 10 which is being connected to the Internet is stored. More specifically, an ID of the on-line game apparatus 10, a connection address, a player name, etc. are stored. Each game apparatus 10 periodically transmits notifying data indicating that it is being connected to the server 72 when being connected to the Internet. The notifying data includes an ID, a player name, and a connection address of the game apparatus. The server 72 generates or updates on-line machine list data when receiving the notifying data. It should be noted that the server 72 may be provided for managing one communication game. However, if the server 72 manages a plurality of kinds of games, the above-described information about the game apparatus 10 which is being connected to the server 72 is stored in association with a game name (game identifying information) as shown in FIG. 6.

In the communication game system, as described above, identifying information of the game apparatus 10 of the opponent's with whom a communication game is played in a short-distance wireless communication is stored as a friend list. Then, if the game apparatus 10 connects to the Internet to inquire the server 72, and finds that the game apparatus 10 of the opponent stored in the friend list connects to the Internet, the game apparatus obtains a connection address of the game apparatus 10 from the server 72, and executes a communication game with the game apparatus 10 via the Internet. In addition, in this non-limiting example implementation, if friends registered in the friend list of a certain game apparatus 10 are not acquainted with each other, both of them are introduced to each other. That is, if a friend of the friend with whom a communication game is played is being connected to the Internet, the game apparatus 10 can obtain information about the game apparatus 10 of the friend of the friend from the friend. Thus, the game apparatus can execute a communication game with the introduced friend, and register the identifying information of the opponent in the friend list data. Accordingly, in the communication game system, a network game is executable while widening a circle of friends.

Figure 7:
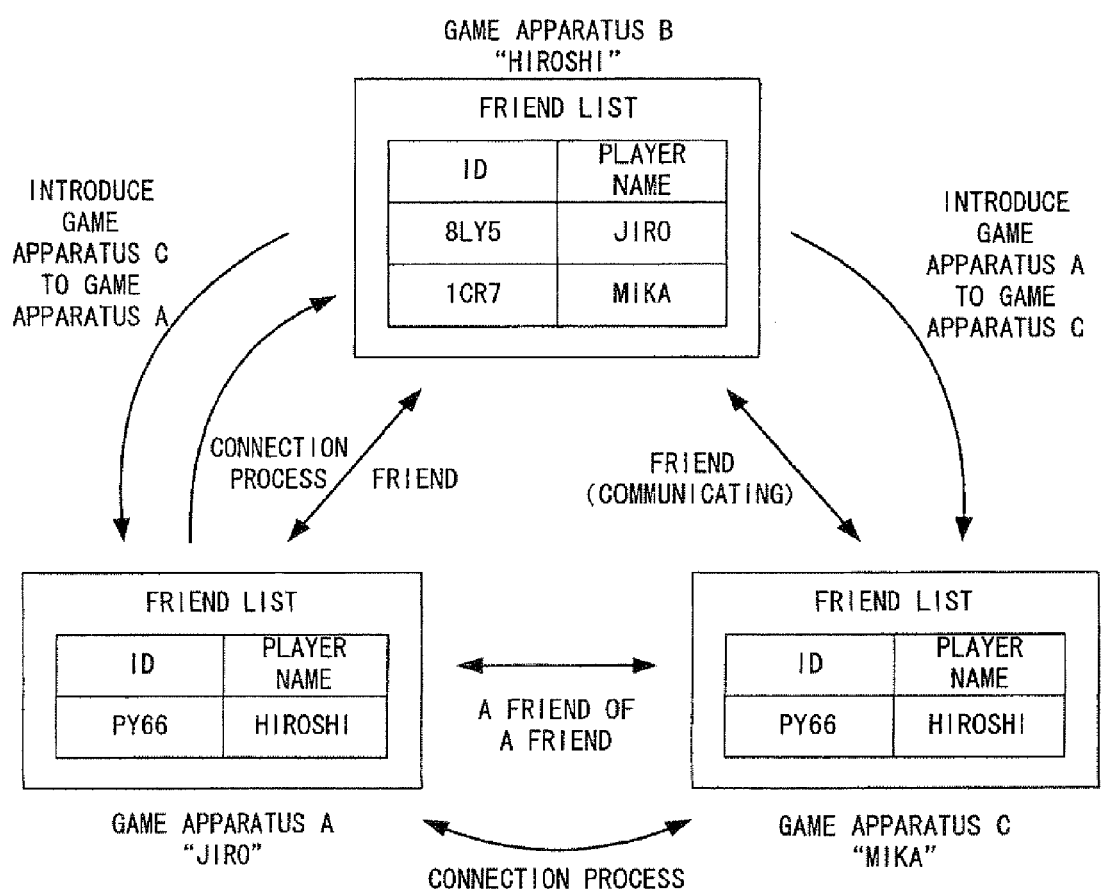
FIG. 7 is an illustrative view showing one exemplary illustrative non-limiting implementation of an outline of an Internet communication process.

For example, FIG. 7 shows an outline of the Internet communication game. In FIG. 7, a game apparatus B (player name: "Hiroshi") and a game apparatus C (player name: "Mika") are registered in each other's friend list data, and are acquainted with each other. Also, a game apparatus A (player name: "Jiro") and the game apparatus B are registered in each other's friend list, and are acquainted with each other. However, the game apparatus A and the game apparatus C are not acquainted with each other. FIG. 7 shows a case that the game apparatus B and the game apparatus C are being communicated across the Internet. In this case, when the game apparatus A connects to the Internet, and receives a inquiry result from the server 72 that the game apparatus B is being connected, the game apparatus A can transmit a connection request to the game apparatus B and can establish connection with the game apparatus B to execute a communication game. On the other hand, since the game apparatus B is being communicated with the game apparatus C, after executing a communication game with the game apparatus A, for example, the game apparatus B introduces the game apparatus A to the game apparatus C. That is, the game apparatus B transmits information including a connection address, etc. of the game apparatus C to the game apparatus A while transmitting information including a connection address, etc. of the game apparatus A to the game apparatus C. Thus, when the game apparatus A and the game apparatus C are introduced to each other by the game apparatus B, they connect with each other via a network to execute a communication game.

Figure 8:
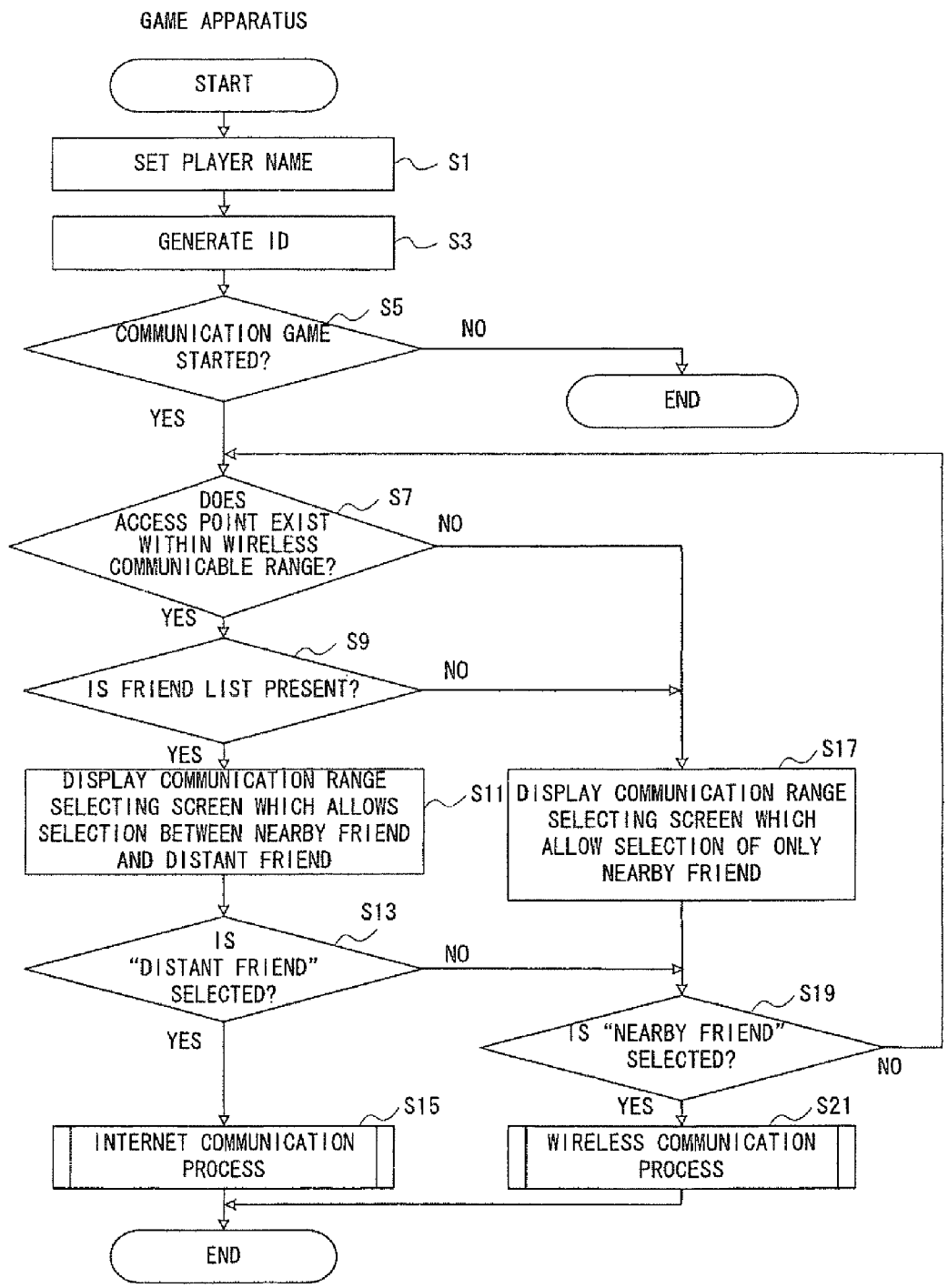
FIG. 8 is a flowchart showing one example exemplary illustrative non-limiting implementation of an operation of the game apparatus.

In the communication game system, an operation at a time of executing a communication game is described with reference to flowcharts. FIG. 8 shows one example of a game operation of the game apparatus 10. When the game process is started, the CPU core 42 executes a setting of the player name on the basis of operation input data from the operating switch 20, input data from the touch panel 22, or the like in a first step S1 in FIG. 8. The setting of the player name is executed when a communication game is played at first, when a player name is changed, and so forth. The CPU core 42 stores the generated player name data in the self-identifying data storing area 74. It should be noted that if the player name has already been set and stored in the RAM 28b of the memory card 28, the CPU core 42 previously reads the player name data from the RAM 28b and stores it in the RAM 48.

Next, in a step S3, the CPU core 42 executes an ID generating process. For example, the CPU core 42 generates an ID of this game apparatus 10 on the basis of an MAC address of the wireless communication portion 64, the current time information of the clock IC, and the like, and stores the ID data in the self-identifying data storing area 74. The generation of the ID is executed when the player name is set at first, when the player name is changed, and so forth. If the ID has already been generated and stored in the RAM 28b of the memory card 28, the CPU core 42 previously reads the ID data from RAM 28b and stores it in the RAM 48.

Succeedingly, the CPU core 42 determines whether or not a communication game is to be started on the basis of the operation input data from the operating switch 20, the touch input data from the touch panel 22, etc. in a step S5. If "NO" in the step 5, that is, if no input data for instructing the start of the game is detected after a lapse of a predetermined time period, and so forth, the game process is ended.

If "YES" in the step 5, that is, if the input data for instructing the start of the game is detected, the CPU core 42 determines whether or not a wireless LAN access point 70 exists within a wireless communicable range on the basis of the data obtained from the wireless communication portion 64 in a step S7. For example, if the wireless communication portion 64 detects an electric wave emitted from the wireless LAN access point 70, the data indicative of presence thereof is applied to the CPU core 42.

If "YES" in the step 7, the CPU core 42 determines whether or not friend list data is stored in the RAM 48 in a step S9. If "YES" in the step 9, the CPU core 42 displays a communication range selecting screen on which the player can select between a distant friend and a nearby friend on the LCD 12 or 14 by use of the GPU 50 or 52 and LCD controller in a step S11. On the communication range selecting screen, as shown in FIG. 9(A), the "nearby friend" and the "distant friend" are displayed in a selectable manner, and one of them can be selected according to selection of the cursor by operating the operating switch 20 or the touch panel 22. The "nearby friend" corresponds to a communication game by a short-distance wireless communication, and the "distant friend" corresponds to the network communication game via the Internet. The selection screen allows the player to select between a communication with a nearby person and a communication with a distant person.

Succeedingly, in a step S13, the CPU core 42 determines whether or not the "distant friend" out of the alternatives is selected on the basis of the input data, etc. from the operating switch 20 or the touch panel 22. If "YES" in the step 13, the CPU core 42 executes an Internet communication process in a step S15. The process allows examination of the communication game via the Internet. The operation of the Internet communication process is described from FIG. 11 to FIG. 14 below.

On the other hand, if "NO" in the step 7, that is, if the wireless LAN access point 70 is not detected, the process proceeds to a step S17. If "NO" in the step 9, that is, if the friend list data has not yet been generated, the process proceeds to a step S17.

In the step S17, the CPU core 42 displays a communication range selecting screen on which only the nearby friend is selectable. On the communication range selecting screen, only the "nearby friend" is displayed in a selectable state as shown in FIG. 9 (B), and the "distant friend" is displayed in an non-selectable state (light color, reverse state, etc.), or may not be displayed. If the wireless LAN access point 70 is not detected, the game apparatus 10 cannot be connected to the Internet to make impossible to execute the Internet communication. Thus, a network game is excluded from the alternatives of the communication game. Also, if the friend list has not yet been stored also, this means that there is no opponent to execute the communication game over the Internet, so that similarly, the network game is excluded from the alternatives of the communication game.

If "NO" in the step S13, or if the process in the step S17 is ended, the CPU core 42 determines whether or not the "nearby friend" out of the alternatives is selected on the basis of the input data, etc. from the operating switch 20 or the touch panel 22. If "NO" in the step 19, the process returns to the step S7.

Figure 10:
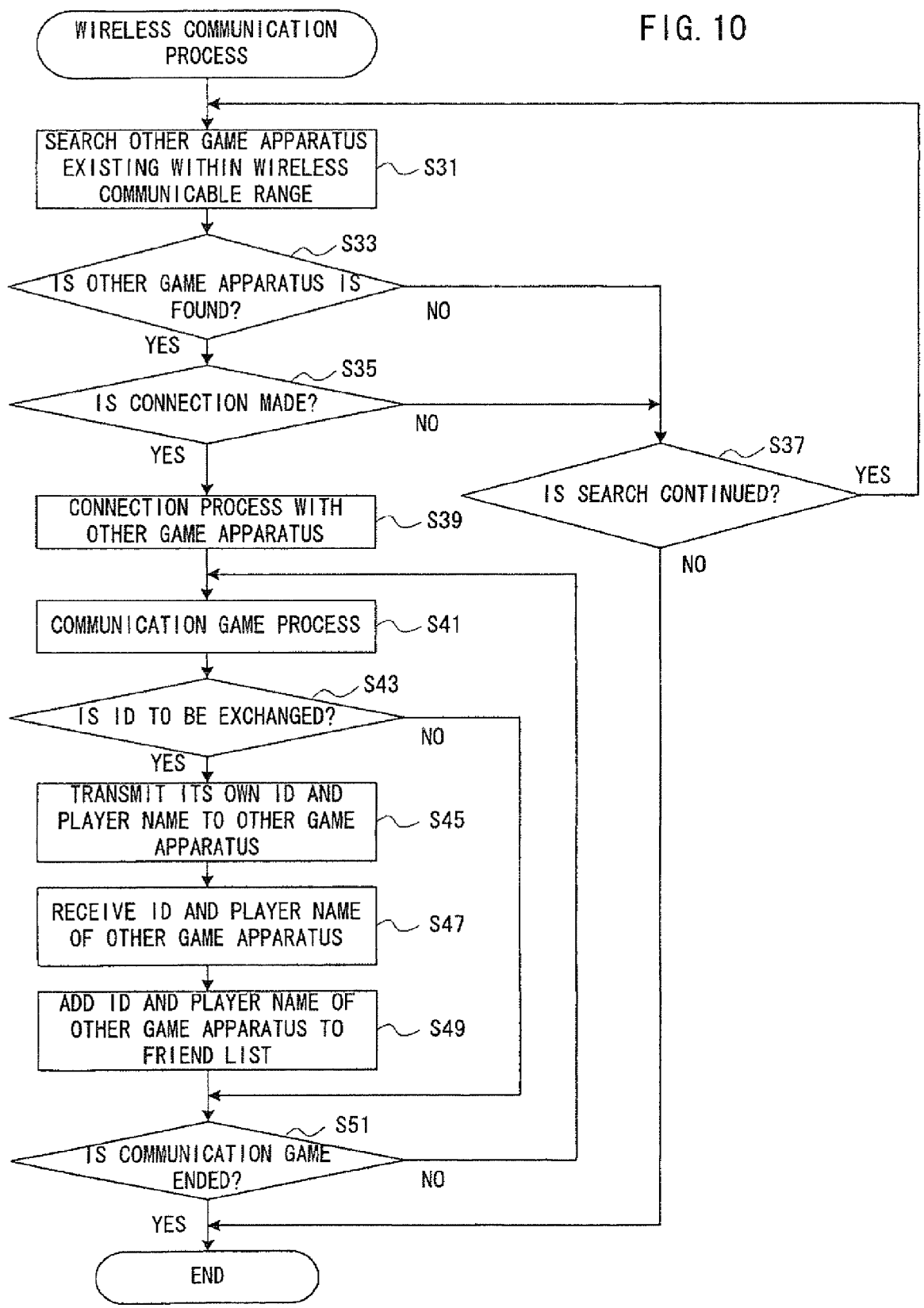
FIG. 10 is a flowchart showing one exemplary illustrative non-limiting implementation of an operation in a wireless communication process in FIG. 8.

On the other hand, if "YES" in the step 19, the CPU core 42 executes a wireless communication process in a step S21. The process allows execution of the communication game by the short-distance wireless communication. The operation of the wireless communication process is shown in FIG. 10 described later. After completion of the step S15 or the step S21, the game process is ended.

FIG. 10 shows one example of the operation of the wireless communication process in the step S21 in FIG. 8. The CPU core 42 first searches other game apparatus 10 existing within the wireless communicable range in a step S31. For example, the CPU core 42 broadcasts predetermined data by utilizing the wireless communication portion 64, and tries to receive predetermined data transmitted from other game apparatus 10.

Next, in a step S33, the CPU core 42 determines whether or not other game apparatus 10 is found as a result of the search on the basis of the data obtained from the wireless communication portion 64. If "YES" in the step 33, the CPU core 42 determines whether or not the found game apparatus 10 is to be connected on the basis of the input data from the operating switch 20 or the touch panel 22 in a step S35. It should be noted that this may be determined automatically rather than a player's instruction.

On the other hand, if "NO" in the step 33, that is, if the data from other game apparatus 10 is not detected, the process proceeds to a step S37. If "NO" in the step 35, that is, if input data instructing connection to the found game apparatus 10 is not detected, for example, the process proceeds to a step S37. In the step S37, the CPU core 42 determines whether or not the search is to be continued on the basis of the input data from the operating switch 20, the touch panel 22, etc. It should be noted that whether or not the search is to be continued is made not by instruction from the player, but may automatically be made by detection of lapse of a predetermined time period, for example. If "NO" in the step 37, that is, if the input data indicative of suspending the search is detected, the wireless communication process is ended. On the other hand, if "YES" in the step 37, the process returns to the step S31.

Alternatively, if "YES" in the step 35, that is, if the input data indicative of instructing connection is detected, the CPU core 42 executes a connection process with the other game apparatus 10 to establish a connection via the wireless communication portion 64 in a step S39.

Succeedingly, in a step S41, the CPU core 42 executes a communication game process via the wireless communication portion 64. This allows execution of a game or an application while transmitting and receiving the data with the other connected game apparatus 10.

Then, in a step S43, the CPU core 42 determines whether or not the ID is to be exchanged. It is determined whether or not the exchange is instructed on the basis of the input data, etc. from the operating switch 20 or the touch panel 22, for example. It should be noted that whether or not the exchange is performed may be determined automatically rather than an instruction from the player.

If "YES" in the step 43, the CPU core 42 transmits the data including its own ID and the player name stored in the self-identifying data storing area 74 to the other game apparatus 10 through the wireless communication portion 64 in a step S45. It should be noted that if a communication game is executed among a plurality of game apparatuses 10, its own identifying information is transmitted to these plurality of game apparatuses 10.

In a step S47, the CPU core 42 receives the data including the ID and the player name transmitted from the other game apparatus 10 via the wireless communication portion 647 and stores it in the RAM 48. It should be noted that if the communication game is executed among the plurality of game apparatuses 10 identifying information as to these plurality of game apparatuses 10 are received.

Then, in a step S49, the CPU core 42 extracts the ID and the player name from the received data, and additionally stores them by bringing the ID into correspondence with the player name in the friend list storing area 80. It should be noted that if they have already been stored in the friend list data, the identifying information is not added.

On the other hand, if "NO" in the step 43, the process proceeds to a step S51 without exchanging the ID. In the step S51, it is determined whether or not a communication game is to be ended on the basis of the input data from the operating switch 20 or the touch panel 22, for example. If "NO" in the step 51, the process returns to the step S41. On the other hand, if "YES" in the step 51, the wireless communication process is ended. It should be noted that although illustration is omitted, if a new ID, etc. is added to the friend list in the step S49, at the completion of the process, the CPU core 42 stores the friend list data together with other game data to be saved in the RAM 28b of the memory card 28.

Figure 11:
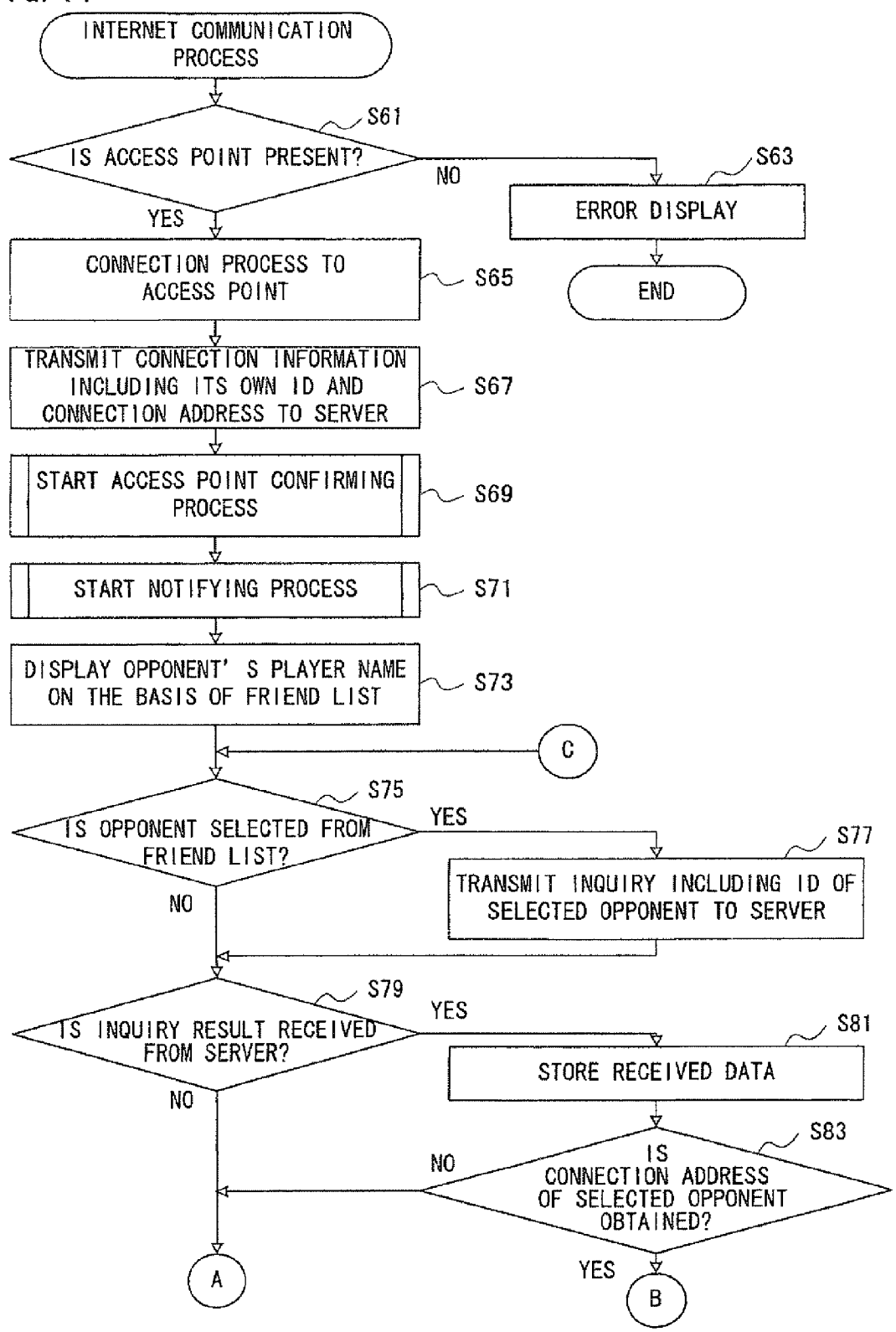
FIG. 11 is a flowchart showing a part of one exemplary illustrative non-limiting implementation of an operation in the Internet communication process in FIG. 8.

FIG. 11 shows one example of an operation of the Internet communication process in the step S15 in FIG. 8. In a first step S61 in FIG. 11, the CPU core 42 determines whether or not the wireless LAN access point 70 exists within the wireless communicable range similarly to the step S7 in FIG. 8. If "NO" in the step 61, since it is impossible to access the Internet, the CPU core 42 executes an error display process in a step S63 to display an error message such as "no access point", for example, on the LCD 12 or the LCD 14. Then, the Internet communication process is ended.

On the other hand, if "YES" in the step 61, the CPU core 42 executes a connection process to the wireless LAN access point 70 via the wireless communication portion 64 in a step S65, and establishes a connection with the wireless LAN access point 70. For example, by executing the process, the game apparatus 10 obtains a connection address private IP address) from the wireless LAN access point 70, and then stores it in the self-identifying data storing area 74.

Succeedingly, in a step S67, the CPU core 42 transmits to the server 72 the connection information data including information, such as its own ID, a connection address, a player name, etc. stored in the self-identifying data storing area 74 via the wireless communication portion 64. The server address stored in the server address storing area 76 is set to the destination IP address of the transmission data, and the connection address stored in the self-identifying data storing area 74 is set to the transmission source IP address. The connection address is translated into a global IP address at the wireless LAN access point 70, an ISP, or the like, so that the server 72 can store the global IP address of the game apparatus 10 as a connection address in the memory, and transmit data to the game apparatus 10.

Figure 15:
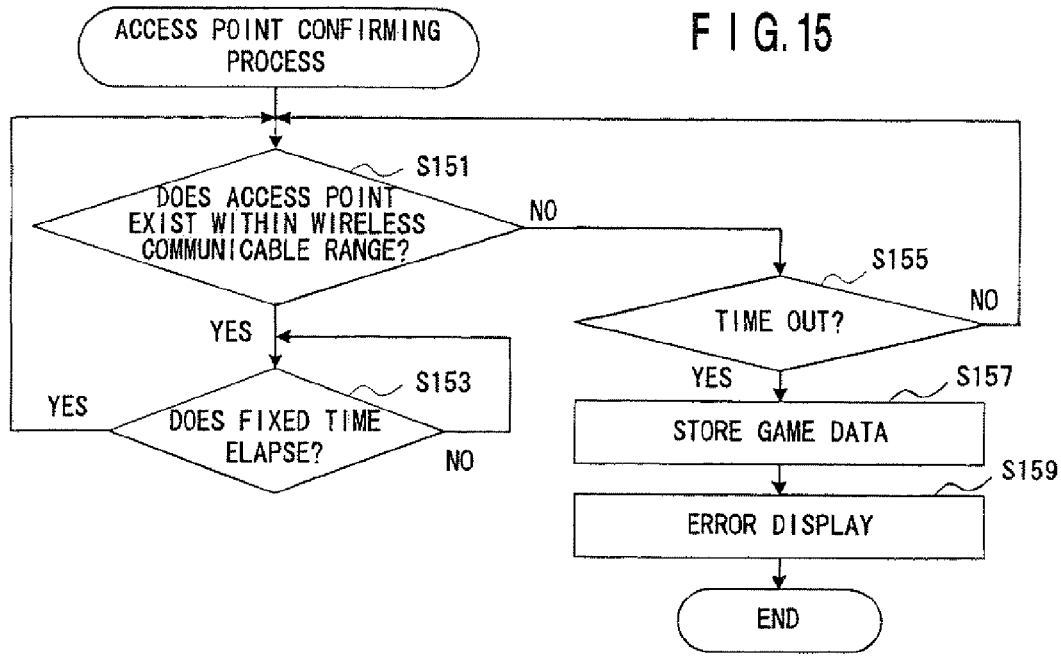
FIG. 15 is a flowchart showing one exemplary illustrative non-limiting implementation of an operation of an access point confirming process in FIG. 11.

Then, in a step S69, the CPU core 42 starts an access point confirming process. By executing the process, it is continuously confirmed whether or not a wireless LAN access point 70 exists in the communicable range of the game apparatus 10. The CPU core 42 executes the access point confirming process in parallel with other process. FIG. 15 shows one example of an operation of the access point confirming process.

In a step S151 in FIG. 15, the CPU core 42 determines whether or not the wireless LAN access point 70 exists within the wireless communicable range similarly to the step S7 in FIG. 8. If "YES" in the step 151, the CPU core 42 determines whether or not a fixed time period elapses in a step S153. If "NO" in the step 153, a lapse of a fixed time is waited while if "YES", the process returns to the step S151.

On the other hand, if "NO" in the step 151, the CPU core 42 determines whether or not a timeout occurs in a step S155. For example, it is determined whether or not a predetermined time period elapses since the wireless LAN access point 70 was undetectable. If "NO" in the step 155, the process returns to the step S151. On the other hand, if "YES" in the step 155, CPU core 42 stores necessary game data in the RAM 28b of the memory card 28 in a step S157. Also, in a step S159, the CPU core 42 performs an error display similarly to the step S63 in FIG. 11, and then ends the access point confirming process and the Internet communication process.

Figure 16:
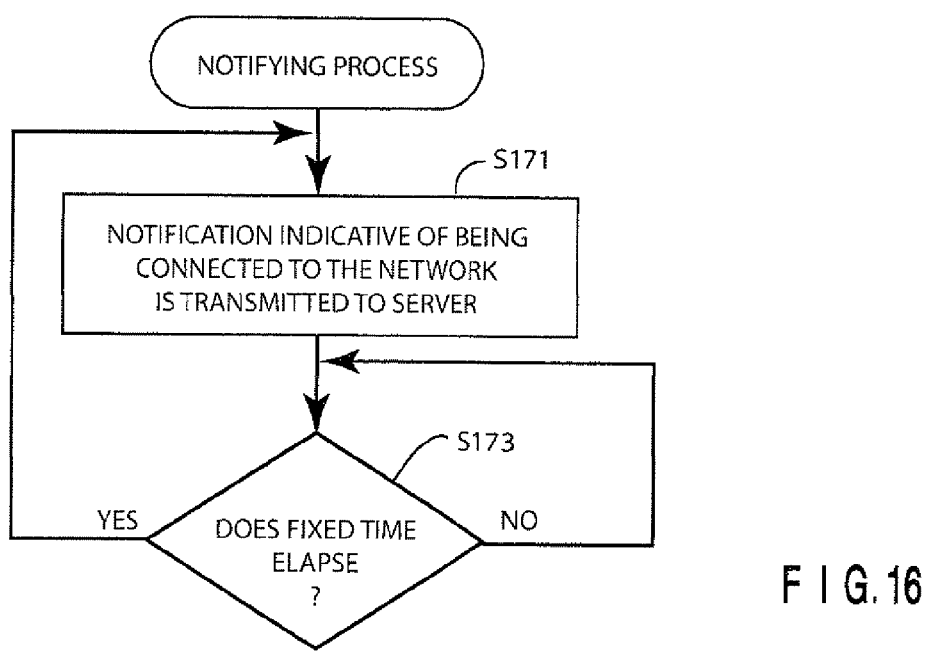
FIG. 16 is a flowchart showing one exemplary illustrative non-limiting implementation of an operation of a notifying process in FIG. 11.

Returning to FIG. 11, in a step S71, the CPU core 42 starts a notifying process. By executing the process, the fact that the game apparatus 10 is being connected is continuously notified to the server 72. The CPU core 42 executes a notifying process in parallel with another process. FIG. 16 shows one example of an operation of a notifying process.

In a step S171 in FIG. 16, the CPU core 42 transmits notifying data indicating that the game apparatus is on line or being connected to the server 72 via the wireless communication portion 64. The notifying data includes the identifying information of the game apparatus 10, so that the server 72 can know whether or not the game apparatus 10 is being connected by receiving the notifying data. Succeedingly, in a step S173, the CPU core 42 determines whether or not a fixed time period elapses. If "NO" in the step 173, a lapse of the fixed time period is waited while if "YES", the process returns to the step S171. It should be noted that the CPU core 42 also ends the notifying process when ending the Internet communication process.

Returning to FIG. 11, in a step S73, the CPU core 42 displays a player name of the opponent registered in the list on the basis of the friend list data by utilizing the GPU 50 or 52, the LCD controller 60, etc on the LCD 12 or 14.

Next, in a step S75, the CPU core 42 determines whether or not an opponent of the communication game is selected from the displayed friend list on the basis of the input data from the operating switch 20 or the touch panel 22 and the display position data of the player name, etc. It should be noted that the opponent may be selected not by player's will, but at random or in order, for example. Or, a plurality of opponents may be selected from the friend list to inquire about them as a single unit, or all the opponents in the list may be selected to inquire about them as a single unit.

If "YES" in the step 75, the CPU core 42 transmits the inquiry data including the ID of the selected opponent to the server 72 via the wireless communication portion 64 in a step S77. Thus, it is possible to select any opponent from the friend list, and inquire about the selected opponent.

If "NO" in the step S75, or if the step S77 is ended, the CPU core 42 determines whether or not the inquiry result is received from the server 72 over the wireless communication portion 64 in a step S79, and. If "YES" in the step 79, the CPU core 42 stores the received data in the RAM 48 in a step S81. If the game apparatus 10 about which the server 72 is inquired is being connected, the connection address of the game apparatus 10 is included in the received data, and if it is not being connected, the connection address is not included in the received data. In a succeeding step S83, the CPU core 42 determines whether or not the connection address of the selected opponent is obtained. If "NO", the process proceeds to a step S85 in FIG. 12. On the other hand, if "YES" in the step 83, that is, if the selected opponent is being connected, the process proceeds to a step S89 in FIG. 12.

Figure 12:
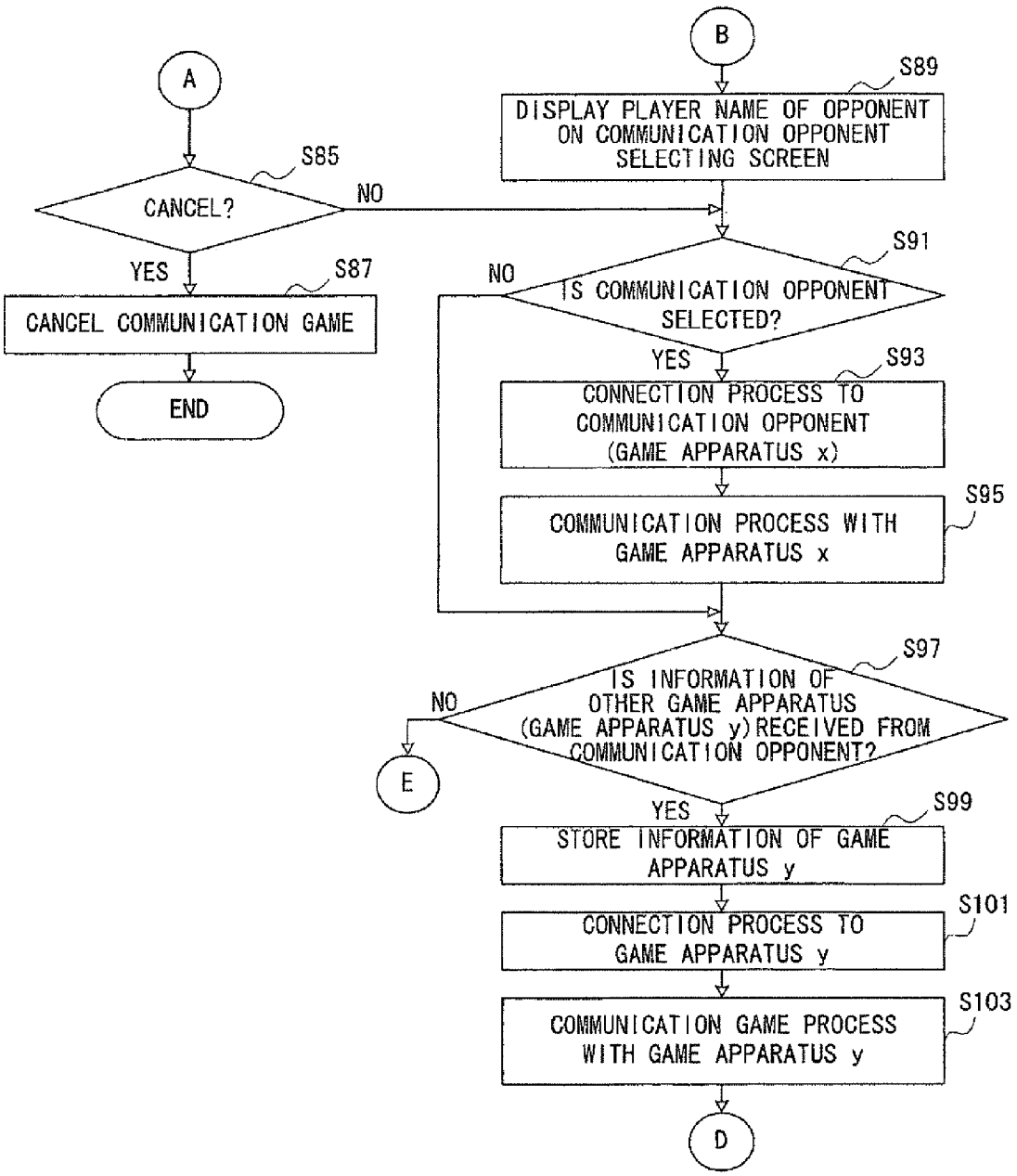
FIG. 12 is a flowchart showing a part continuing from FIG. 11.

In the step S85 in FIG. 12, the CPU core 42 determines whether or not the communication game is to be canceled on the basis of the input data, etc. from the operating switch 20 or the touch panel 22. If "YES" in the step 85, that is, if the input data for instructing cancel is detected, and so forth, the CPU core 42 executes a communication game canceling process in a step S87 to end the Internet communication process. On the other hand, if "NO" in the step 85, the process proceeds to a step S91.

Figure 17:
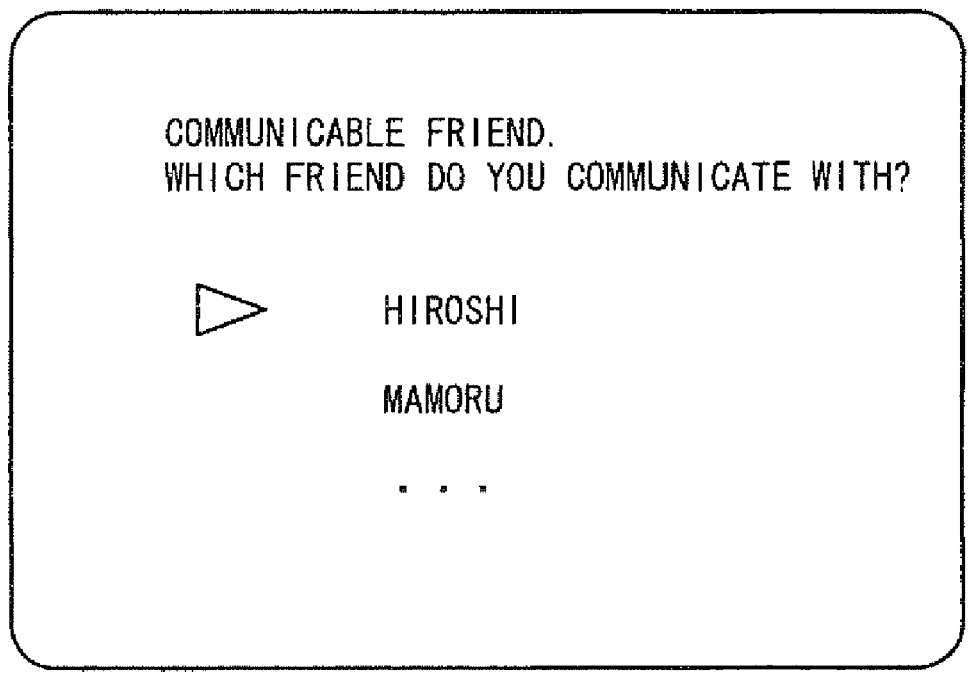
FIG. 17 is an illustrative view showing one exemplary illustrative non-limiting implementation of a communication opponent selecting screen.

In the step S89 in FIG. 12, the CPU core 42 displays player names of the opponent on the communication opponent selecting screen. FIG. 17 shows one example of the screen on which player names corresponding to the game apparatuses 10 which is being connected the Internet are displayed as a communicable friend. The player can instruct or determine a player name with a cursor by operating the operating switch 20 or the touch panel 22 to thereby select an opponent with whom the communication game is executed on this screen.

Succeedingly, in a step S91, the CPU core 42 determines whether or not a communicating opponent is selected on the screen in FIG. 17 on the basis of the input data from the operating switch 20 or the touch panel 22, and the display position data of the player name, etc. If "NO" in the step 91, that is, if the communicating opponent is not selected on the communication opponent selecting screen, the process proceeds to a step S97.

On the other hand, if "YES" in the step 91, the CPU core 42 executes a connection process to the selected communicating opponent (for the sake of convenience, referred to as "game apparatus x") in a step S93. It should be noted that the CPU core 42 stores the identifying information of the selected communicating opponent, that is, an ID, a player name, a connection address, and the like in the communication opponent information storing area 82. For example, the CPU core 42 transmits a connection request in which the connection address of the game apparatus x stored in the communication opponent information storing area 82 is set to a destination IP address via the wireless communication portion 64, and receives a connection response from the game apparatus x, and whereby, it is possible to connect to the game apparatus x.

Then, in a step S95, the CPU core 42 executes a communication game process with the game apparatus x via the wireless communication portion 64. Thus, the game and the application (including chat) are executed while transmitting and receiving the data with the connected communicating opponent.

In the succeeding step S97, the CPU core 42 determines whether or not information about other game apparatus (for the sake of convenience, referred to as a "game apparatus y") is received from the communicating opponent stored in the communication opponent information storing area 82. In this non-limiting example implementation, if the communicating opponent has the game apparatus y with which a communication is being made, the communicating opponent makes an introduction as a middleman, so that the information about the game apparatus y is transmitted from the communicating opponent. Referring with FIG. 7 example, this holds in a case that information about the game apparatus A is transmitted from the apparatus B to the game apparatus C.

Figure 13:
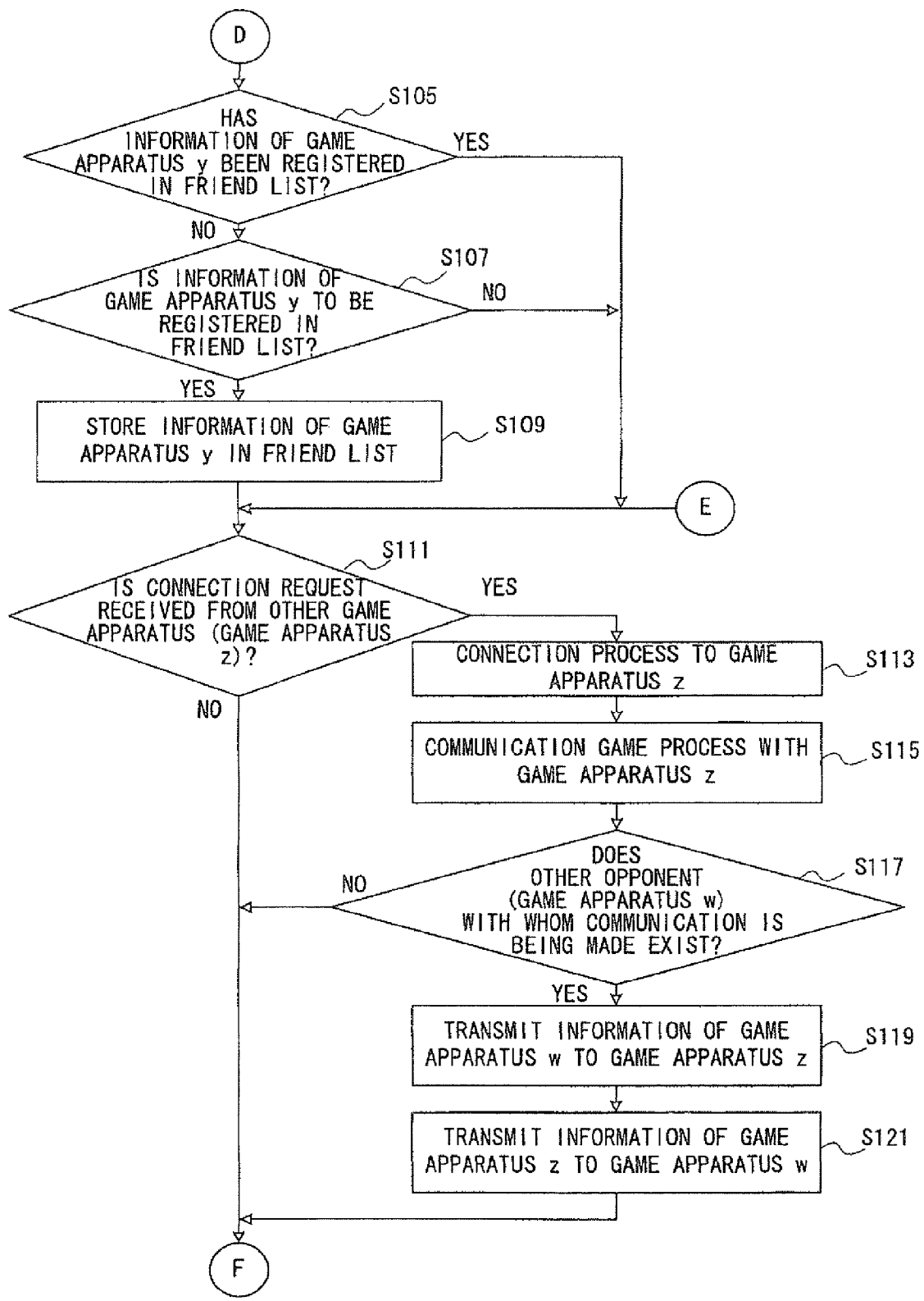
FIG. 13 is a flowchart showing a part continuing from FIG. 12.

If "NO" in the step 97, that is, if the communicating opponent has not the game apparatus y with which a communication is being made, the process proceeds to a step S111 in FIG. 13. On the other hand, if "YES" in the step 97, the CPU core 42 stores the received information about the game apparatus y in the RAM 48 in a step S99. The received data in includes the identifying information, such as an ID, a player name, a connection address, etc. of the game apparatus y, the CPU core 42 stores (adds) the identifying information of the game apparatus y in the communication opponent information storing area 82. In a succeeding step S101, the CPU core 42 executes a connection process to the game apparatus y to allow a connection to the game apparatus y similarly to the step S93. Then, in a step S103, the CPU core 42 executes a communication game process with the game apparatus y similarly to the step S95. Thus, in the network communication game, a range of the communicable opponent is made wider, so that it is possible to execute a communication game over the Internet with an opponent with whom the identifying information has not been exchanged by the short-distance wireless communication. After completion of the step S103, the process proceeds to a step S105 in FIG. 13.

In the step S105 in FIG. 13, the CPU core 42 determines whether or not the information of the game apparatus y has been registered in the friend list data. If "NO" in the step 105, the CPU core 42 determines whether or not the information on the game apparatus y is to be registered in the friend list in a step S107. For example, it is determined whether or not the input data instructing the registration is detected from the operating switch 20 or touch panel 22. In this case, the player can register only the identifying information of a desired opponent in the friend list. It should be noted that it may be determined that they are automatically registered in the friend list without relaying on player's decision if the identifying information is not registered.

If "YES" in the step 107, the CPU core 42 adds the information on the game apparatus y, that is, the ID and the player name to the friend list storing area 80 in a step S109. Thus, the information on the game apparatus y introduced by the friend can be added in the friend list as new friend's information. After completion of the step S109, the process proceeds to a step S111. It should be noted that if the player also wants the game apparatus y to introduce another friend, the process may be returned to the step S97 in FIG. 12 after completion of the step S109. If "YES" in the step S105, or if "NO" in the step S107, the process directly returns to the step S111.

In the step S111, the CPU core 42 determines whether or not a connection request is received from other game apparatus (for the sake of convenience, referred to be a "game apparatus z") via the wireless communication portion 64. The connection request is data to be transmitted in the connection process to the game apparatus 10 in the steps S93, S101, and etc. Describing with reference to FIG. 7 example, this holds in a case that the game apparatus A transmits a connection request to the game apparatus C.

If "YES" in the step 111, the CPU core 42 executes a connection process to the game apparatus z in a step S113 to allow a connection to the game apparatus z. It should be noted that the data received as a connection request includes information, such as an ID, a player name, a connection address, etc. of the game apparatus z, so that CPU core 42 stores (adds) the ID, the player name, and the connection address in the communication opponent information storing area 82. Accordingly, by transmitting data making the connection address a destination IP address, the CPU core 42 can transmit a connection response to the game apparatus z. Then, in a step S115, the CPU core 42 executes a communication game process with the game apparatus z similarly to the step S95 in FIG. 12.

Next, in a step S117, the CPU core 42 determines whether or not other opponent (hereinafter, referred to "game apparatus w" for the sake of convenience) with whom a communication is being made exists on the basis of the data in the communication opponent information storing area 82. That is, it is determined whether or not the game apparatus w with which its own game apparatus that is being communicated to be introduced to the game apparatus z exists. If "YES" in the step 117, the CPU core 42 reads the information (ID, player name, connection address, etc.) on the game apparatus w from the communication opponent information storing area 82 in a step S119, and transmits it to the game apparatus z via the wireless communication portion 64. In a step S121, the CPU core 42 reads the information (ID, player name, connection address, etc.) on the game apparatus z from the communication opponent information storing area 82, and transmits it to the game apparatus w via the wireless communication portion 64. Thus, it is possible to mediate between the game apparatus z and the game apparatus w.

Figure 14:
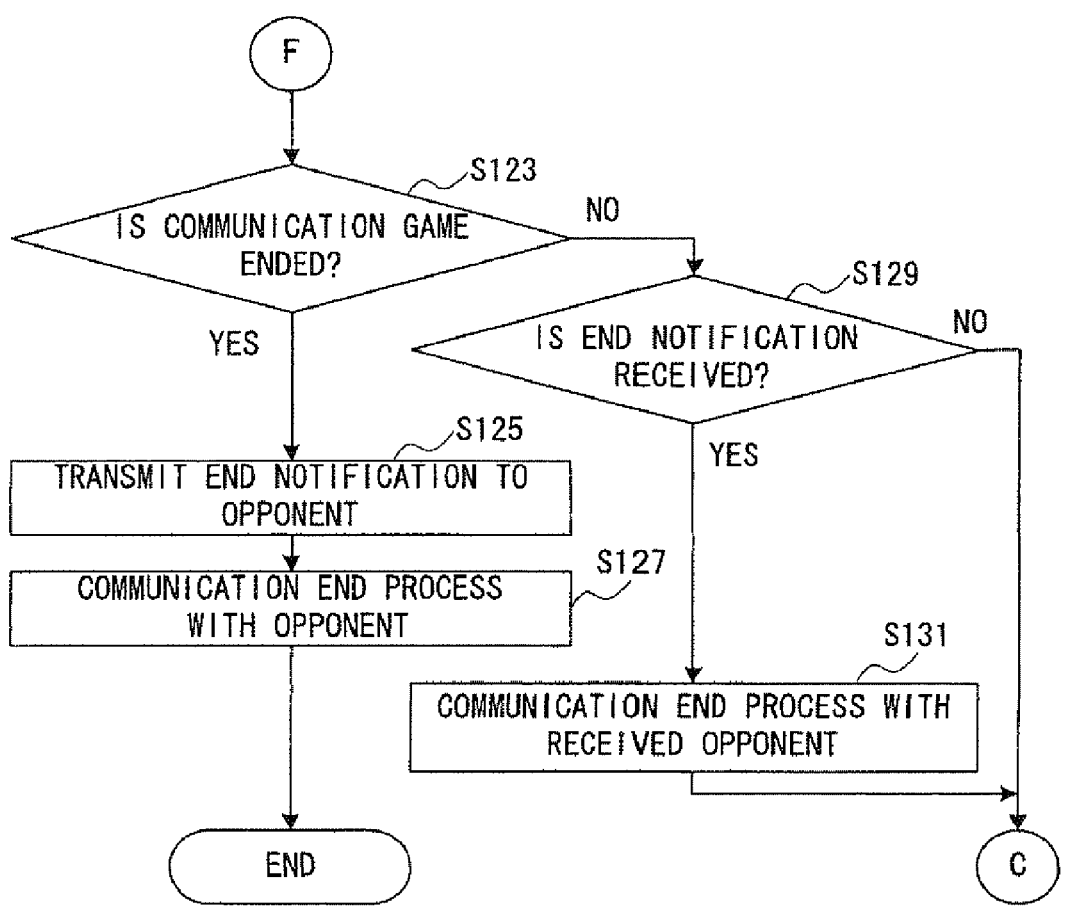
FIG. 14 is a flowchart showing a part continuing from FIG. 13.

If "NO" in the step S111, if "NO" in the step S117, or if the step S121 is ended, the process proceeds to a step S123 in FIG. 14.

In the step S123 in FIG. 14, the CPU core 42 determines whether or not the communication game is to be ended. For example, it is determined whether or not input data instructing an end from the operating switch 20 or the touch panel 22 is detected. If "YES" in the step 123, the CPU core 42 transmits an end notification including its own ID, etc. to the opponent stored in the communication opponent information storing area 82 via the wireless communication portion 64 in a step S125. Then, in a step S127, the CPU core 42 executes a communication end process with the opponent to end the Internet communication process.

On the other hand, if "NO" in the step 123, the CPU core 42 determines whether or not the end notification is received in a step S129. If "YES" in the step S129, the CPU core 42 executes a communication end process with the opponent from whom the end notification is received in a step S131. For example, the ID, etc. of the opponent is extracted from the end notification to delete data of the opponent corresponding to the ID, etc. from the communication opponent information storing area 82. If the step S131 is ended, or if "NO" in the step 129, the process returns to the step S75 in FIG. 11 in order to continue a communication game over the network.

In this non-limiting example implementation, the server 72 functions of managing the on-line machine list, and responding to the inquiry, etc. More specifically, when the game apparatus 10 connects to the Internet, the identifying information of the game apparatus 10 is registered in the on-line machine list. When it is inquired whether the game apparatus 10 in the friend list is being connected, it is determined whether or not the inquired game apparatus 10 is being connected, and a response as the result is sent. Additionally, the on-line machine list is updated on the basis of the notification periodically sent from the on-line game apparatus 10.

Figure 18:
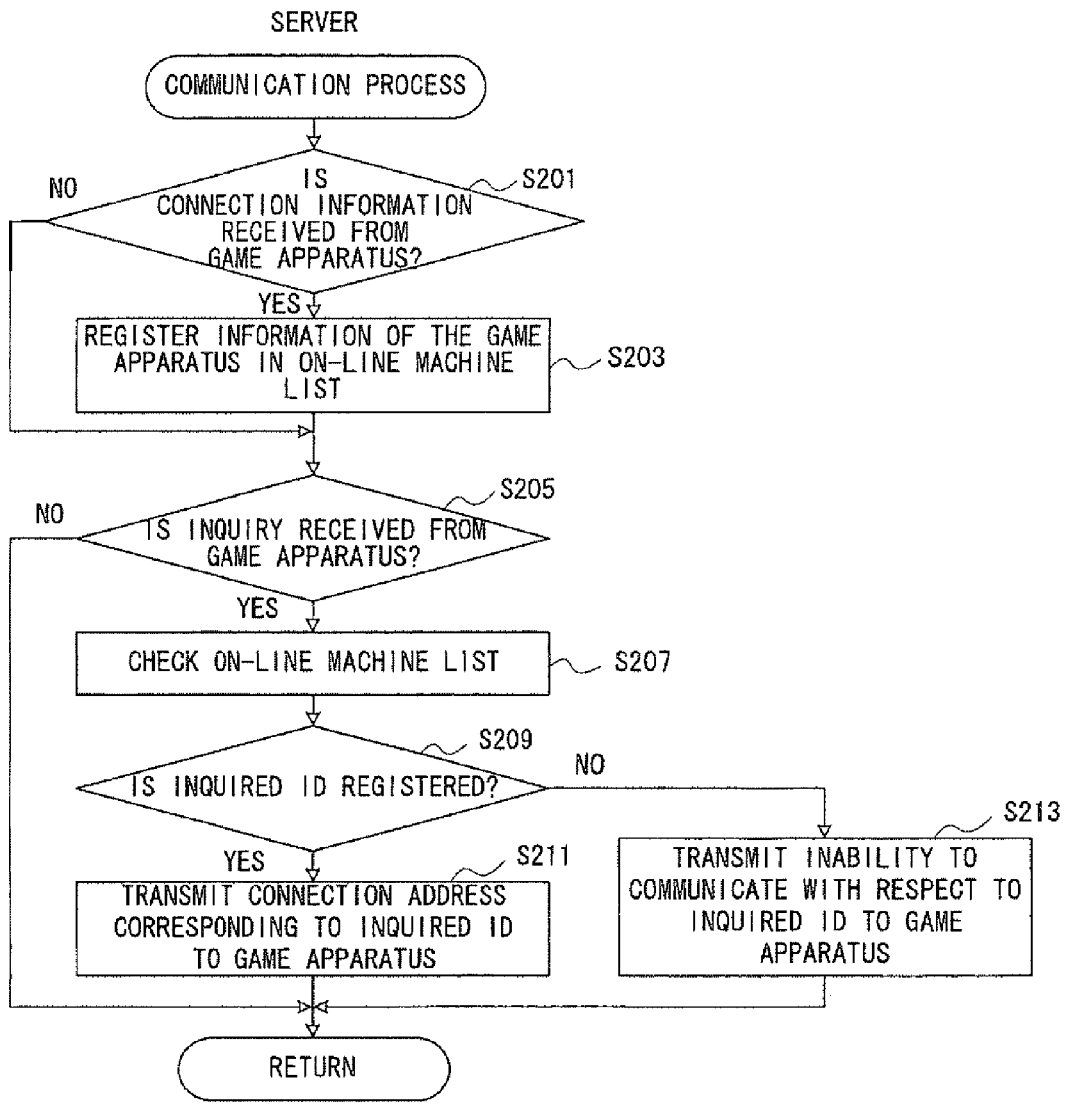
FIG. 18 is a flowchart showing one exemplary illustrative non-limiting implementation of an operation of a communication process of the server.

FIG. 18 shows one example of an operation of a communication process of the server 72. The communication process is repeated every fixed time period. In a first step S201 in FIG. 18, the CPU of the server 72 not shown determines whether or not connection information is received form the game apparatus 10. The connection information is transmitted from the game apparatus 10 connected to the Internet in the step S67 in FIG. 11.

If "YES" in the step S201, the CPU of the server 72 registers the identifying information of the game apparatus in the on-line machine list in a step S203. More specifically, an ID, a connection address, and a player name are store (added to) in the on-line machine list storing area 84 of the memory. It should be noted that if the server 72 manages a plurality of kinds of games, connection information including a game name is received, so that the server creates on-line machine list data for each game so as to manage them.

If the step S203 is ended, or if "NO" in the step 201, the CPU of the server 72 determines whether or not an inquiry is received from the game apparatus 10 in a step S205. The inquiry is transmitted in the step S77 in FIG. 11. If "YES" in the step 205, the CPU of the server 72 checks the ID, etc. included in the inquiry data against the ID, etc. registered in the on-line machine list of the on-line machine list storing area 84 in a step S207.

Then, in a step S209, the CPU of the server 72 determines whether or not the inquired ID is registered in the list. If "YES" in the step 209, that is, if the inquired game apparatus 10 is being communicated with the server 72, the CPU of the server 72 reads a connection address corresponding to the inquired ID from the on-line machine list storing area 84, and transmits the inquiry result data including the connection address, etc. to the game apparatus 10 which has transmitted the inquiry in a step S211.

On the other hand, if "NO" in the step 209, the CPU of the server 72 transmits inquiry result data indicative of inability to communication with the inquired ID to the game apparatus 10 which has transmitted an inquiry in a step S213. After completion of the step S211 or the step S213, or if "NO" in the step 205, the notifying process is ended.

Figure 19:
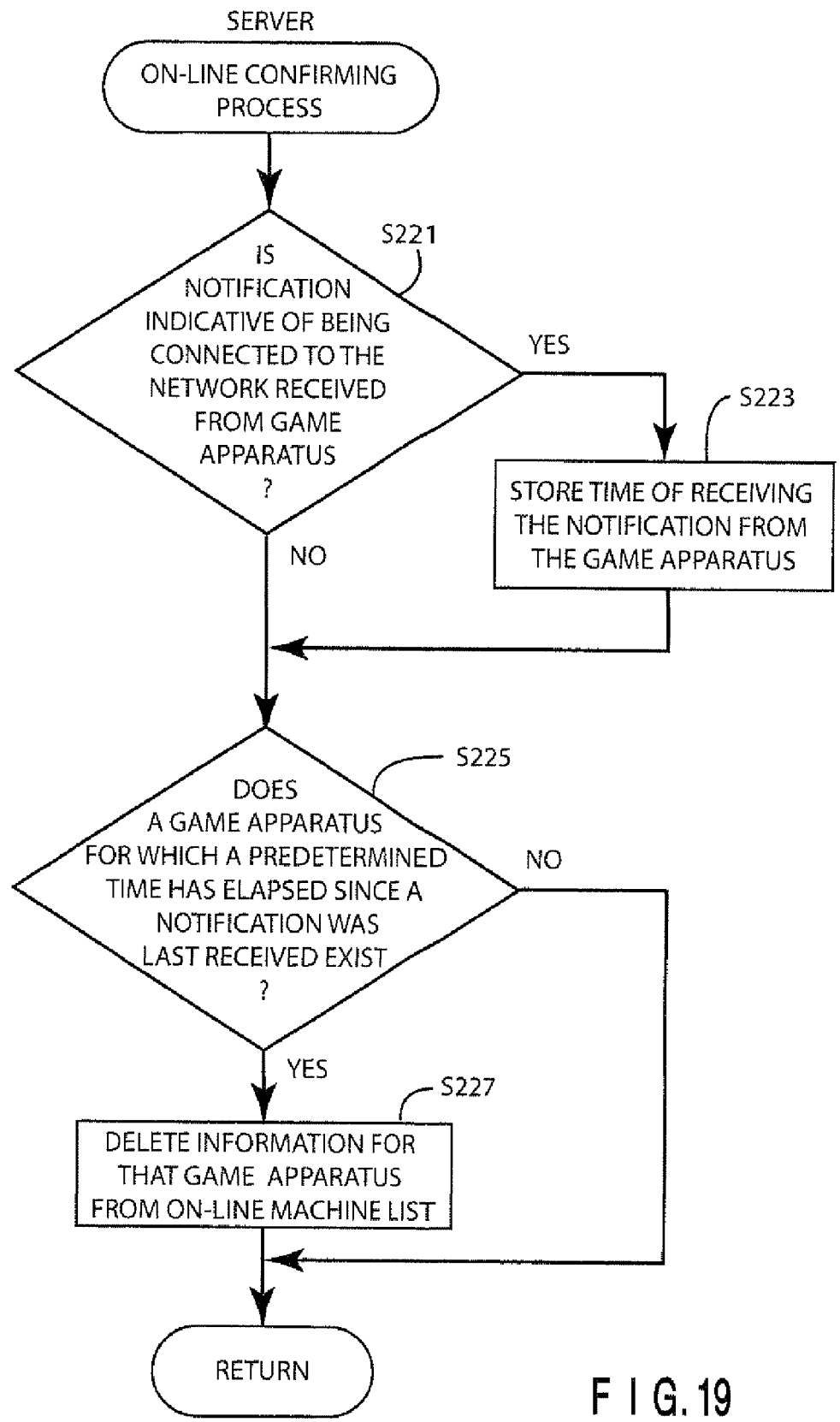
FIG. 19 is a flowchart showing one exemplary illustrative non-limiting implementation of an operation of an on-line confirming process of the server.

FIG. 19 shows one example of an operation of on-line confirming process of the server 72. The on-line confirming process is repeatedly executed every fixed time period. In a first step S221 in FIG. 19, the CPU of the server 72 determines whether or not the notifying data indicative of being connected to the server 72 is received from the game apparatus 10. The notification from the game apparatus 10 is transmitted in the step S171 in FIG. 16.

If "YES" in the step 221, the CPU of the server 72 obtains a receiving hour of the notification as to the game apparatus 10 from the output data of the clock IC not shown, for example, and stores it in the memory in a step S223.

If the step S223 is ended, or if "NO" in the step 221, the CPU of the server 72 determines whether or not a game apparatus about which a predetermined time period has elapsed since the notification was received exists on the basis of the current hour obtained from the clock IC and the latest receiving hour stored in the memory in a step S225. If "YES" in the step 225, the CPU of the server 72 deletes the information on the game apparatus 10 from the on-line machine list storing area 84 in a step S227, and updates the on-line machine list data. If the step S227 is ended, or if "NO" in the step 225, the on-line confirming process is ended.

According to this exemplary illustrative non-limiting implementation, data is sent and received with an opponent by the short-distance wireless communication to thereby exchange the identifying information and register the identifying information of the opponent. Then, if each game apparatus exists away from each other, each game apparatus accesses the network such as the Internet, and determines whether or not the opponent is being connected on the basis of the identifying information via the server 72, for example. If the opponent is being connected to the server, a connection address of the opponent can be obtained to make it possible to send and receive data with the opponent. Thus, each game apparatus determines whether or not a network communication can be made with the opponent whose identifying information is registered, and if possible, each game apparatus can make a network communication with the registered opponent. Accordingly, since this allows a network connection with only the opponent with whom the identifying information is exchanged and registered, it becomes possible to participate in the network game safely and easily, realizing a network game in which a general game user can easily participate. Also, even if one makes a communication with an opponent by a short-distance wireless communication, and then has to be parted from the opponent, the communication game can be made between them over the network. In addition, merely obtaining identifying information of a friend and registering it, it becomes possible to easily make a network communication with the friend.

In the network communication, if a communicating opponent has other opponent with whom a communication is being made, it is possible to obtain the identifying information of the other opponent by introduction, capable of performing a communication with an unknown opponent. Thus, it is possible to widen the range of the opponent with whom a network communication can be made. Also, the identifying information of the introduced opponent can be registered in the friend list, so that a circle of fiends is widened by a network communication game.

Thus, according to the communication game system, by merely making a communication locally with a nearby friend, the identifying information of the friend can be obtained and saved, so that even if the friend is parted, it is possible to play a communication game with the friend irrespective of the distance with the friend. Also, by performing a network communication, a friend of a friend can be introduced to widen a circle of friends. Thus, even if there are a few friends at first, the player can enjoy playing the network game. Furthermore, the circle of friends widens from the closest people, so that it is more safety. Additionally, in the above-described exemplary illustrative non-limiting implementation, if a wireless LAN function is mounted on the game apparatus, the game apparatus can be connected to the Internet by a public wireless LAN or at home, so that the player can easily enjoy playing the network communication. Thus, according to the communication game system, it becomes possible to participate in the network game safely and easily, and therefore, it is possible to realize and provide a network game in which a wide range of people, such as general game users, etc. who avoid playing network games can enjoy and easily participate.

It should be noted that in the above-described exemplary illustrative non- limiting implementation, identifying information obtained from an opponent with whom a short- distance wireless communication is performed is registered in the friend list. However, an obtaining method of the identifying information of the opponent is not limited to the short-distance wireless communication. In another exemplary illustrative non-limiting implementation, the identifying information which is manually input by the user may be registered in the friend list, for example. If so, one can exchange by phone or by e-mail identifying information with a friend with whom he or she seldom meet because they cannot accommodate a schedule with each other or they live at a distant place, and register the identifying information of the opponent by hand, and therefore, it is possible to play a communication game across a network with even a friend or an acquaintance with whom one cannot directly meet.

More specifically, in this exemplary illustrative non-limiting implementation, the identifying information of the opponent is manually registered, so that each player has to know its own identifying information in order to inform the opponent of the identifying information. Thus, in this exemplary illustrative non-limiting implementation, a self-ID display mode is prepared. For example, when the player makes a predetermined operation by utilizing the operating switch 20 or the touch panel 22 on the menu screen (not shown) at a start of the game to select an item, an icon, or the like indicative of the self-ID display mode, its own identifying information is displayed on the screen.

Figure 20:
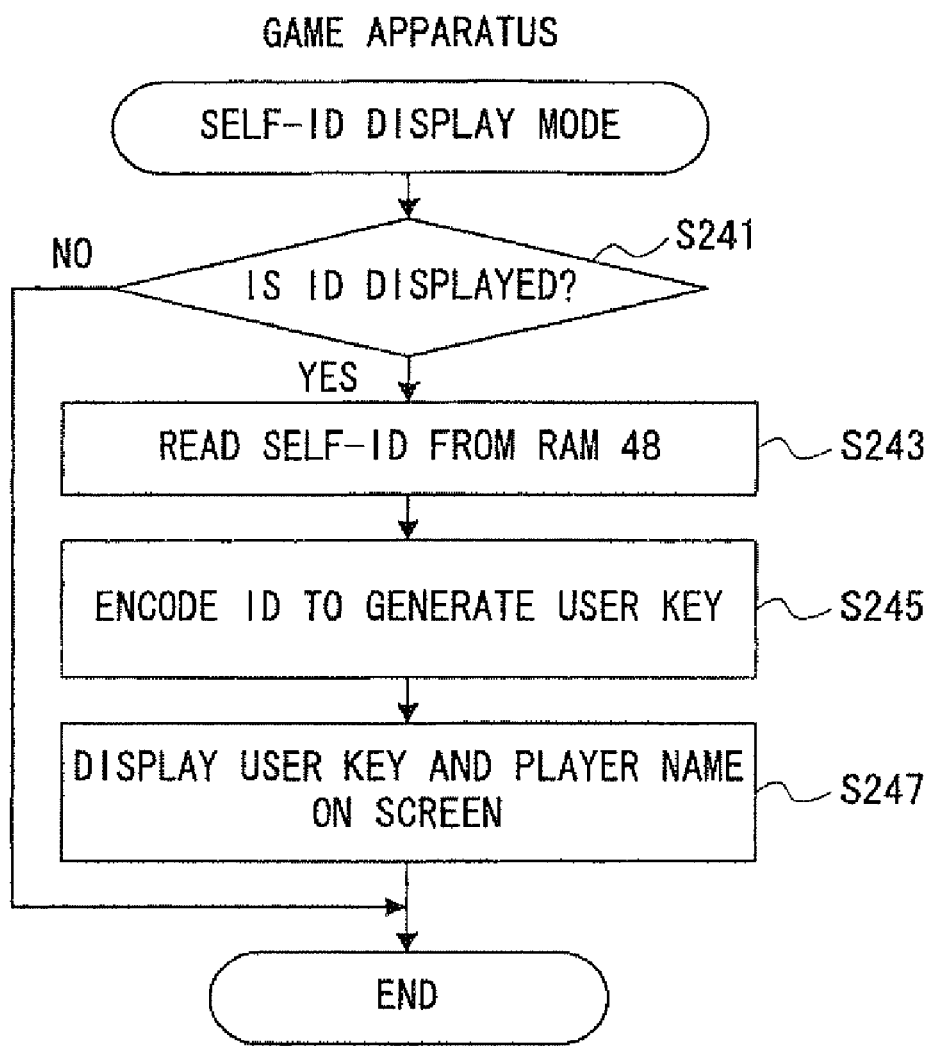
FIG. 20 is a flowchart showing one exemplary illustrative non-limiting implementation of an operation of a self-ID display mode in a game apparatus of another.

FIG. 20 shows one example of an operation in the self-ID display mode. In a step S241 in FIG. 20, the CPU core 42 determines whether or not the ID is displayed. That is, the CPU core 42 determines whether or not the self-ID display mode is selected on the basis of the operation data from the operating switch 20, the touch input data from the touch panel 22, or the like.

If "YES" in the step 241, that is, if the operation data or the touch input data are data instructing execution of the self-ID display mode, the CPU core 42 reads its own ID data from the self-identifying data storing area 74 of the RAM 48 to the work area in a step S243.

Next, in a step S245, the CPU core 42 generates a user key by encoding its own ID. The user key is an ID for display. Thus, in this non-limiting example implementation, for security, the ID is not displayed as it is, but displayed as a symbol string or a character string (user key) which is obtained by encoding the ID.

Then, in a step S247, the CPU core 42 generates a screen (not shown) including the generated user key and the player name by utilizing the GPU 50, etc. on the LCDs 12 or 14. The player name is stored in the self-identifying data storing area 74. It should be noted that the image data of various screens are stored in the ROM 28a in advance.

After completion of the step S247, the process of the self-ID display mode is ended. It should be noted that if "NO" in the step S241, that is, if the ID display mode is not selected, the process returns to the main process without executing the ID display process.

Thus, it is possible to display self-ID (precisely, encoded ID), so that the player can inform his or her friend of its own ID together with the player name.

Figure 21:
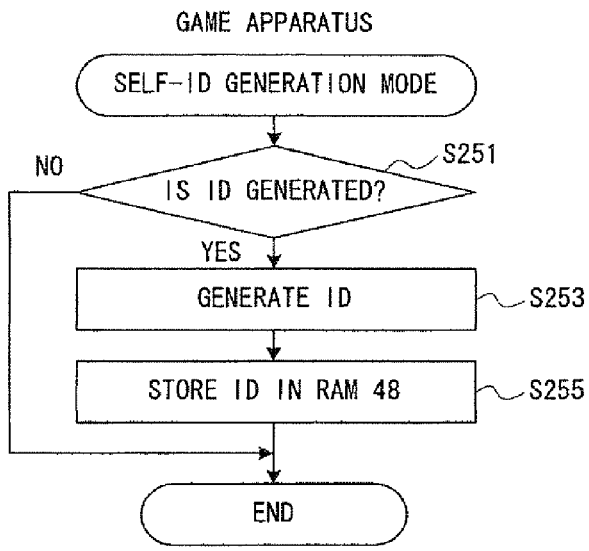
FIG. 21 is a flowchart showing one exemplary illustrative non-limiting implementation of an operation of a self-ID generation mode.
Figure 22:
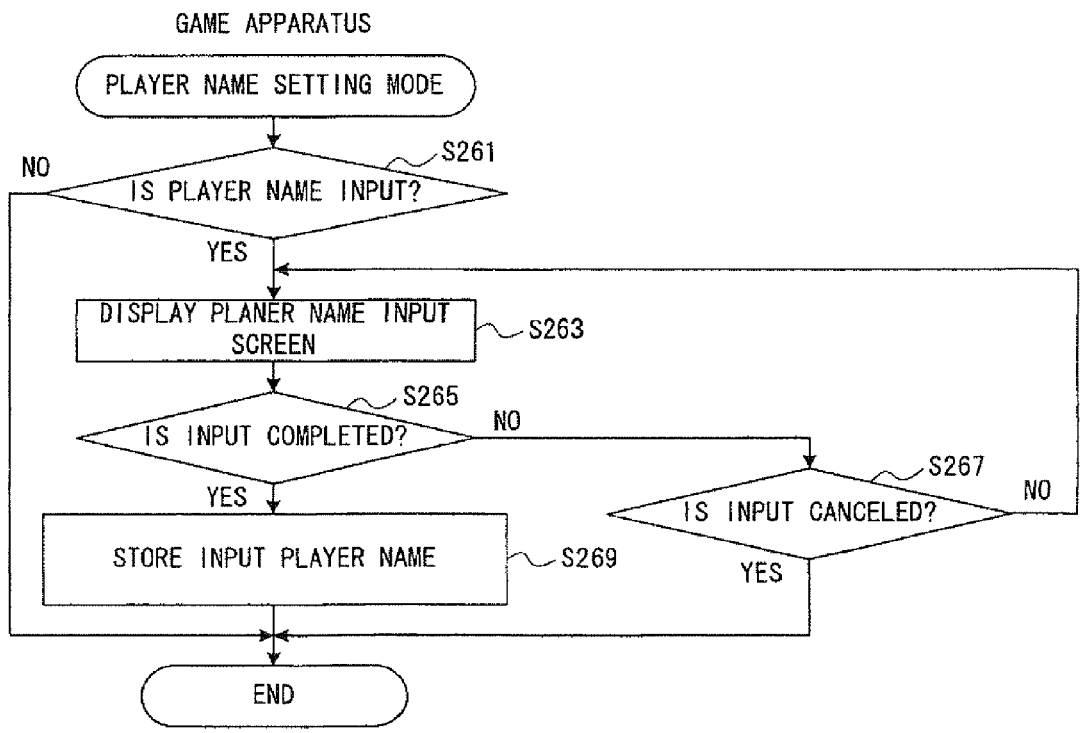
FIG. 22 is a flowchart showing one exemplary illustrative non-limiting implementation of an operation of a player name setting mode.

It should be noted that in this non-limiting example implementation, its own ID is generated in the self-ID generation mode, and its own player name is input in the player name setting mode. FIG. 21 shows one example of an operation of the self-ID generation mode, and is equal to the process in the step S3 in FIG. 8 in the above-described non-limiting example implementation. Furthermore, FIG. 22 shows one example of an operation of the player name setting mode, and is equal to the process in the step S1 in FIG. 8. In the above-described non-limiting example implementation, although the self-ID generation mode, the player name setting mode, and the communication game mode are described in one flowchart (FIG. 8). However, in this non-limiting example implementation, the flowchart is described for each mode for simplicity. In the main process, a process of each mode is executed, and a substantial process of each mode is executed when it is determined that a started-up condition of the mode is satisfied.

The self-ID generation mode is executed when a start of the game process is instructed at first, when a setting of possessor's name of the game apparatus 10 is executed, when a setting of the player name of the communication game is executed, and so forth.

In a step S251 in FIG. 21, the CPU core 42 determines whether or not an ID is to be generated. More specifically, the CPU core 42 determines whether or not an operation as an ID generating instruction is present on the basis of the operation data, the touch input data, etc. For example, it is determined whether or not a start of the communication game is instructed at first, whether or not a possessor's name of the game apparatus 10 is input, or whether or not a player name of the communication game is input.

If "YES" in the step 251, the CPU core 42 generates an ID in a step S253. The ID is generated by combining an MAC address, a current hour, an arbitrary password, and the like.

Then, in a step S255, the CPU core 42 stores the generated ID in a non-volatile memory (flash memory, for example) of the RAM 48. It should be noted that if a game apparatus executes a game process with the memory card 28 attached, the generated ID is stored in the RAM 28*b* of the memory card 28 as well as the self-identifying data storing area 74 of the RAM 48. If the ID has already been stored, the ID is overwritten.

After completion of the step S255, the self-ID generation mode is ended. It should be noted that if "NO" in the step 251, that is, if it is considered that a generation of the ID is not instructed, the ID generating process is not executed. If a game process is restarted after the ID is once generate, the its own ID data is read from the non-volatile memory of the RAM 48 or the RAM 28*b* of the memory card 28 to the self-identifying data storing area 74 of the RAM 48 at an initial setting, for example.

Additionally, the player name setting mode is executed when the player makes a the predetermined operation by utilizing the operating switch 20 or the touch panel 22 to select an item, an icon, etc. indicative of the player name setting mode on the menu screen at a start of the game.

FIG. 22 shows one example of an operation of the player name setting mode. In a step S261 in FIG. 22, the CPU core 42 determines whether or not a player name is input. That is, the CPU core 42 determines whether or not the player name setting mode is selected on the basis of the operation data from the operating switch 20, the touch input data from the touch panel 22, etc.

If "YES" in the step 261, the CPU core 42 displays a player name input screen (not shown) on the LCD 12 or 14 by utilizing the GPU 50, etc. in a step S263. Also, an image of keyboard is displayed on the LCD 14 provided with the touch panel 22, for example. The player can input a player name by a touch input to the software keyboard or by an input with the operating switch 20.

Succeedingly, in a step S265, the CPU core 42 determines whether or not the input is completed. For example, it is determined whether or not an icon indicative of completion of the input is selected on the basis of the operation data, the touch input data, etc. If "NO" in the step 265, the CPU core 42 determines whether or not the input is canceled in a step S267. For example, it is determined whether or not an icon indicative of cancel is selected on the basis of the operation data, the touch input data, etc. If "NO" in the step 267, the process returns to the step S263 to continue to accept an input by the player. Alternatively, if "YES" in the step 267, the input of the player name is canceled, the process of the player name setting mode is ended.

On the other hand, if "YES" in the step 265, the CPU core 42 obtains the input player name in a step S269, and stores it in the self-identifying data storing area 74 of the RAM 48. It should be noted that the player name may be stored in the RAM 28*b* of the memory card 28. If the player name has already been stored, the player name is overwritten.

After completion of the process in the step S269, the process of the player name setting mode is ended. It should be noted that if "NO" in the step 261, the process returns to the main process without executing the process of the player name setting mode. If the game process is restarted after the player name is set once, the player name data is read from the RAM 28*b* of the memory card 28 into the self-identifying data storing area 74 of the RAM 48 at an initial setting, for example.

When being informed of identifying information of the opponent, the player manually registers the identifying information in its own game apparatus 10. Accordingly, in this non-limiting example implementation, the opponent ID input mode is prepared. The opponent ID input mode is executed when the player makes a predetermined operation by utilizing the operating switch 20 or the touch panel 22 to select an item, an icon, etc. indicative of the opponent ID input mode on the menu screen at a start of the game, for example. When the input mode is selected, an ID input screen (not shown) is displayed. On the ID input screen, the player can input identifying information of the opponent by operating the software keyboard displayed on the touch panel 22 of the LCD 14 or by operating the operating switch 20. The input identifying information of the opponent is added to the friend list storing area 80. It should be noted that the identifying information to be input by the player is a user key, so that the user key is decoded to obtain the ID, and the ID is stored in the friend list.

Figure 23:
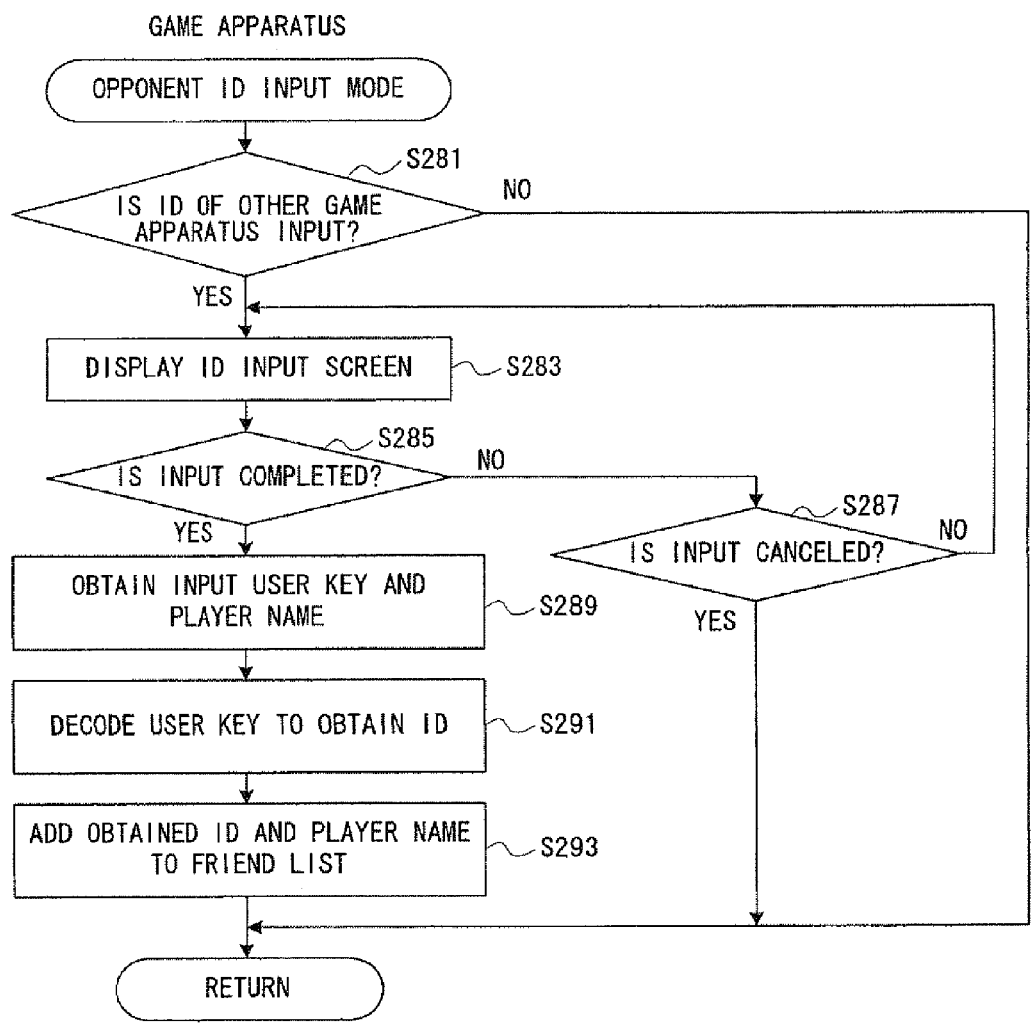
FIG. 23 is a flowchart showing one exemplary illustrative non-limiting implementation of an operation of an opponent ID input mode.

FIG. 23 shows one example of an operation of the opponent ID input mode. In a first step S281 in FIG. 23, the CPU core 42 determines whether or not an ID of the other game apparatus 10 is to be input. That is, the CPU core 42 determines whether or not the opponent ID input mode is selected on the basis of the operation data from the operating switch 20, the touch input data from the touch panel 22, etc.

If "YES" in the step 281, the CPU core 42 displays an ID input screen on the LCD 12 or 14 by utilizing the GPU 50, etc. in a step S283. Similarly to input of the above-described player name, an image of keyboard is displayed on the LCD 14 provided with the touch panel 22, and the player can input an ID of an opponent by a touch input to the software keyboard or by an input with the operating switch 20.

Succeedingly, in a step S285, the CPU core 42 determines whether or not the input is completed. For example, it is determined whether or not an icon indicative of completion of the input is selected on the basis of the operation data, the touch input data, etc. If "NO" in the step 285, the CPU core 42 determines whether or not the input is canceled in a step S287. For example, it is determined whether or not an icon indicative of cancel is selected on the basis of the operation data, the touch input data, etc. If "NO" in the step 287, the process returns to the step S283 to continue to accept an input by the player. Alternatively, if "YES" in the step 287, the input of the opponent ID is canceled, and therefore, the process of the opponent ID input mode is ended.

On the other hand, if "YES" in the step 285, the CPU core 42 obtains the input user key and player name in a step S289, and stores it in a work area of the RAM 48. Succeedingly, in a step S291, the CPU core 42 decodes the obtained user key to obtain the ID of the opponent. Then, in a step S293, the CPU core 42 brings the obtained ID into correspondence with the player name, and stores them in the friend list storing area 80. It should be noted that if the friend list is stored in the RAM 28*b* of the memory card 28, the obtained ID and player name of the opponent are additionally stored in the friend list of the RAM 28*b*, also.

After completion of the step S293, the opponent ID input mode is ended. It should be noted that if "NO" in the step 281, the process is returned to the main process without executing the opponent ID input process. The game process is restarted after the friend list data is once generated, the friend list data is read from the RAM 28*b* of the memory card 28 to the friend list storing area 80 of the RAM 48 at an initial setting, for example.

Thus, it is possible to manually register the identifying information informed by a friend in its own game apparatus 10. It should be noted that in this exemplary illustrative non-limiting implementation, although for security, not ID itself but a user key obtained by encoding the ID is displayed and input as identifying information, the ID may be displayed as it is in another non-limiting example implementation.

Figure 24:
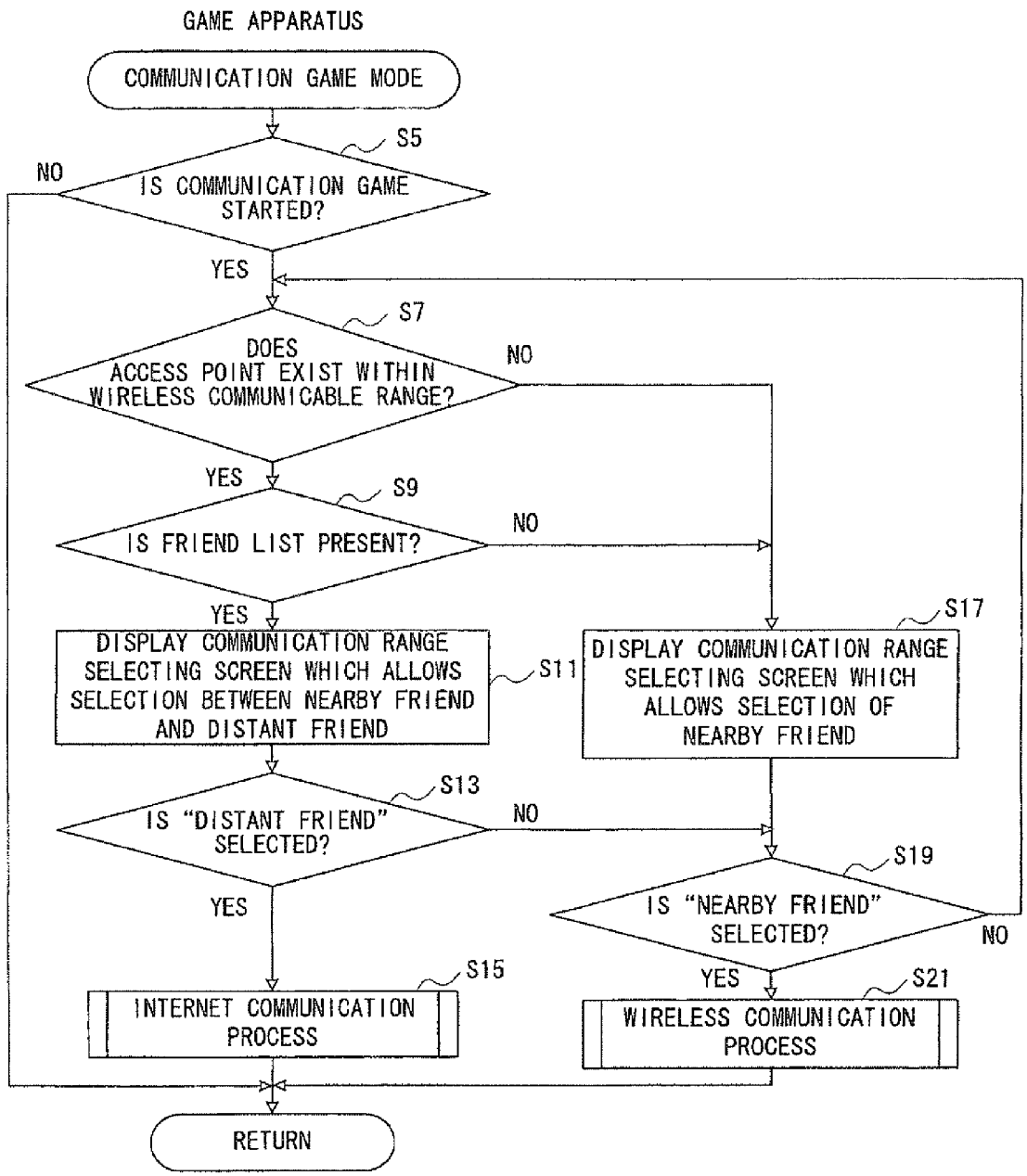
FIG. 24 is a flowchart showing one exemplary illustrative non-limiting implementation of an operation of a communication game mode.

FIG. 24 shows one example of an operation of a communication game mode. The communication game mode is executed when the player makes a predetermined operation by utilizing the operating switch 20 or the touch panel 22 to select an item, an icon, or the like indicative of the communication game mode is selected on the menu screen at a start of the game. The process of the communication game mode in FIG. 24 is the same as the process from the step S5 to the step S21 in the above-described FIG. 8, and therefore, a duplicated description will be omitted by using similar reference numerals.

It should be noted that in this exemplary illustrative non-limiting implementation, it is possible to register the identifying information of the opponent in the friend list by a short-distance wireless communication process as well as by hand. However, in another non-limiting example implementation, the identifying information of the opponent may be registered only by hand. In this case, the game apparatus 10 needs not have a function for the short-distance wireless communication.

If a network communication is selected in the communication game mode, the game apparatus 10 transmits the friend list data in the friend list storing area 80 to the server 72 in addition to the connection information such as its own ID, a connection address, etc. In this non-limiting example implementation, the transmission of the friend list data serves as inquiry about capability of a network communication with other game apparatus 10 registered in the friend list. The reason why the friend list data is transmitted is for confirming whether or not the respective game apparatuses 10 register the identifying information of the opponent in the server 72.

In this non-limiting example implementation, the identifying information of the opponent in the network communication can be registered by manually as well as by the short-distance wireless communication, if the identifying information is leaked, is illegally obtained, only one of the game apparatus 10 may register the identifying information of the opponent. In order to prevent a network communication from being executed in a case that one of the game apparatus registers the identifying information, the server 72 manages the friend lists of both of the game apparatuses 10, and confirms whether or not both of the game apparatuses 10 register each other's identifying information. It should be noted that even if the identifying information of the opponent are legally exchanged by a direct transmission, by a short-distance wireless communication, or the like, if the opponent or the user does not register the identifying information also, a network communication is not executed between the opponent and the user. Thus, if the player wants to refuse to make a network communication with the opponent, he or she obtains the identifying information of the opponent, but may not register it.

Figure 25:
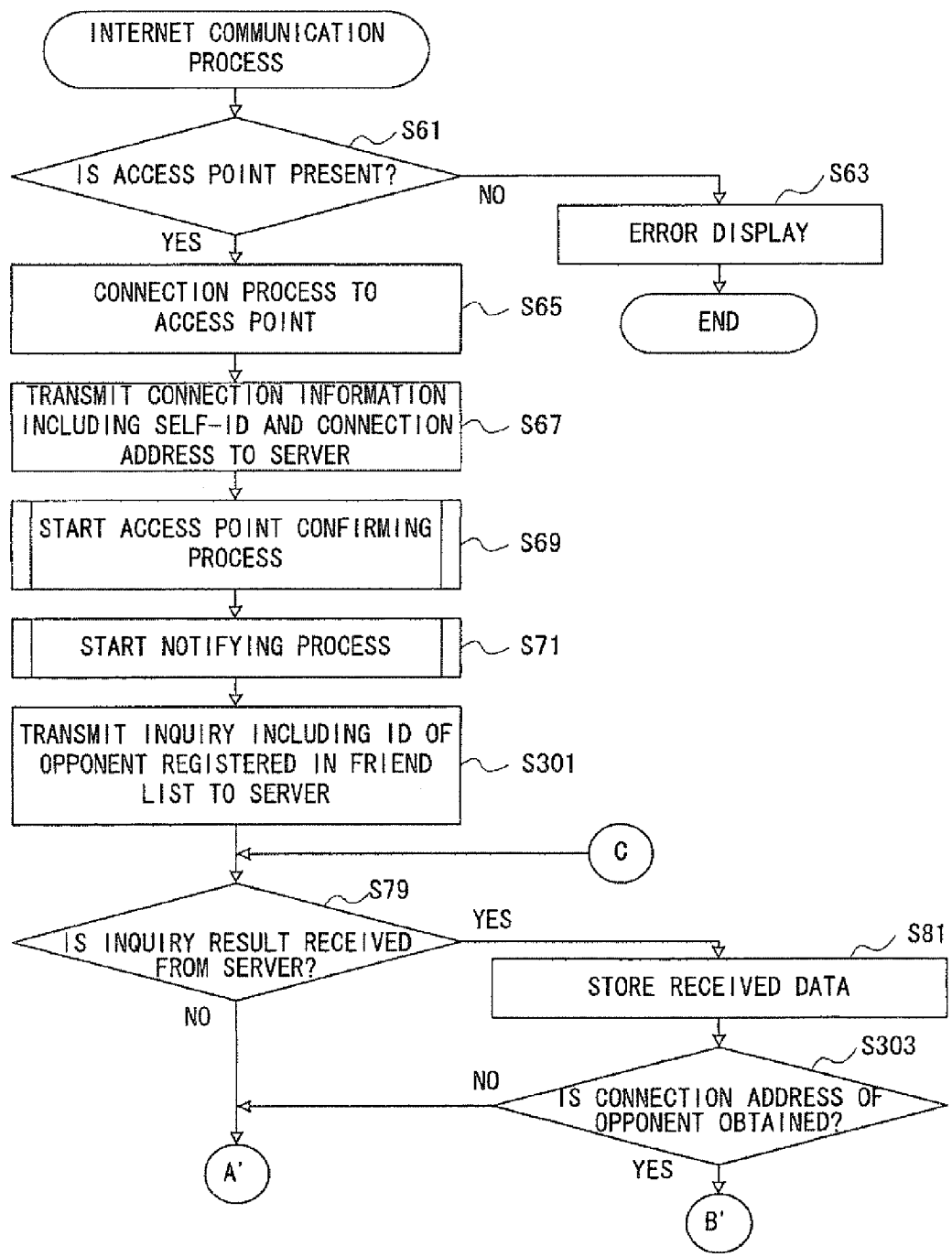
FIG. 25 is a flowchart showing a part of an exemplary illustrative non-limiting implementation of an operation of the Internet communication process in FIG. 24.
Figure 26:
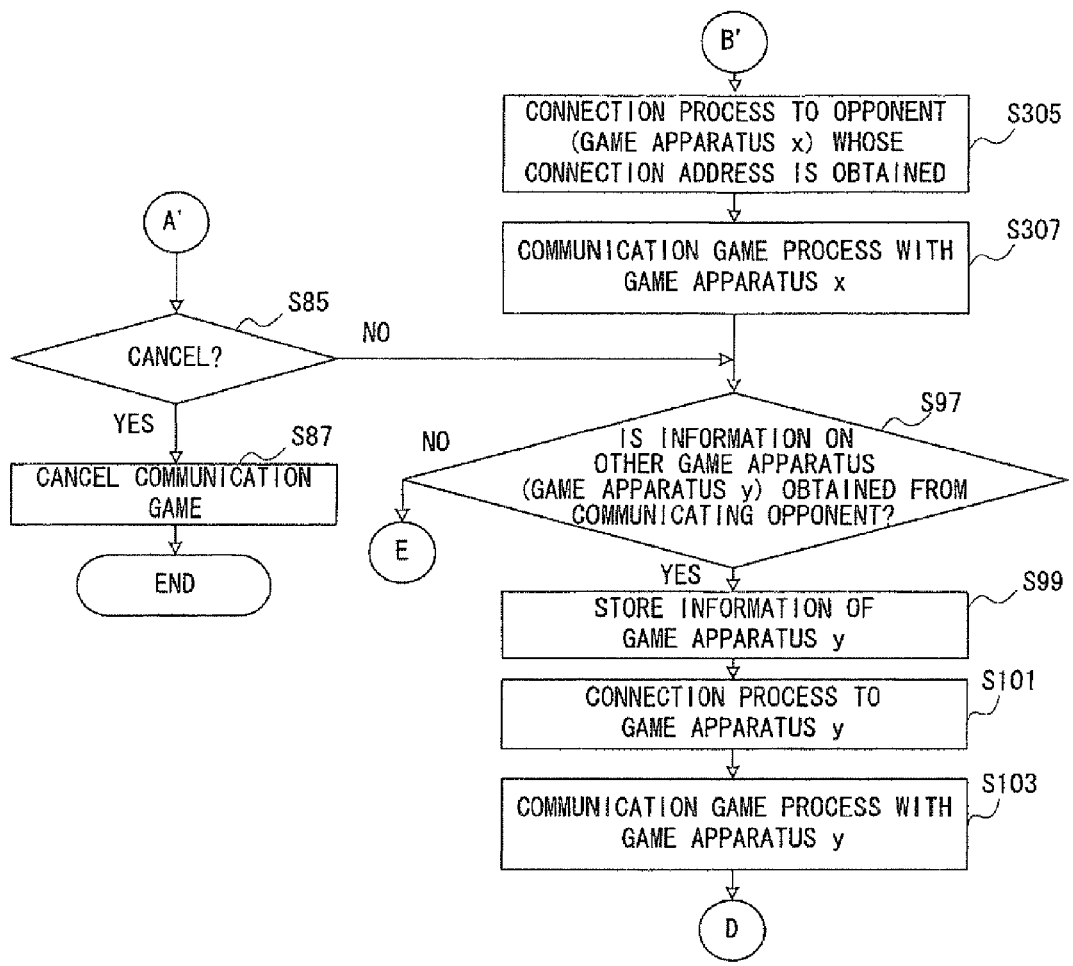
FIG. 26 is a flowchart showing a part continuing from FIG. 25.

FIG. 25 and FIG. 26 show one example of an operation of an Internet communication process in this exemplary illustrative non-limiting implementation. Since the process from step S61 to step S71 in the FIG. 25 is the same as the above-described non-limiting example implementation, a duplicated description is omitted by utilizing similar reference numerals.

After starting a notifying process in a step S71, the CPU core 42 transmits an inquiry including the ID and the player name of the opponent registered in the friend list storing area 80 to the server 72 via the wireless communication portion 64 in a succeeding step S301. It should be noted that the inquiry data to be transmitted includes at least its own ID. In this non-limiting example implementation, IDs and player names of all the opponents registered in the friend list are transmitted. That is, by transmitting the friend list data, an inquiry that all other game apparatuses 10 in the friend list are being communicated over the network is transmitted. It should be noted that only the ID of the opponent stored in the friend list may be transmitted in another non-limiting example implementation.

Succeedingly, in a step S79, the CPU core 42 determines whether or not a result to the inquiry transmitted in the step S301 is received from the server 72. If "YES" in the step 79, the CPU core 42 stores the received data in the work area of the RAM 48 in a step S81.

In a succeeding step S303, the CPU core 42 determines whether or not the connection address of the opponent is obtained. For example, if the server 72 determines that other game apparatus 10 corresponding to the inquired ID is communicable over the network, it transmits the connection address of the opponent corresponding to the ID. If the server 72 determines that the other game apparatus 10 corresponding to the inquired ID is not communicable over the network, it transmits data indicative of incapable of communication corresponding to the ID. Thus, the CPU core 42 determines that at least one connection address is stored in correspondence with the inquired ID as to the received data. Thus, it is determined whether or not it is possible to communicate across the network with other game apparatus registered in the friend list on the basis of the received inquiry result.

It should be noted that if "NO" in the step S303, or if "NO" in the step S79, the process proceeds to the step S85 in FIG. 26.

On the other hand, if "YES" in the step 303, the CPU core 42 executes a connection process with the opponent (referred to as "game apparatus x") whose connection address is obtained in a step S305 in FIG. 26. If a plurality of connection addresses are obtained, a communication connection is made with each of the plurality of game apparatuses x. It should be noted that the CPU core 42 stores the identifying information, that is, an ID, a player name, and a connection address, etc. of the opponent whose connection address is obtained in the communication opponent information storing area 82. Then, in a step S307, the CPU core 42 executes a communication game process with the game apparatus x via the wireless communication portion 64. If a communication can be established with the plurality of game apparatuses 10, a communication game process can be executed with each of the plurality of game apparatuses x.

After completion of the step S307, the process proceeds to the step S97. If "NO" in the step 85, that is, if a cancel is not selected by the user operation, if the inquiry has not yet expired, and so forth, the process proceeds to the step S97. In FIG. 26, the process of step S97 and subsequent steps S99-S103 are similar to the above-described non-limiting example implementation, and also the steps in continuation from the step S103 and in continuation from the "NO" outcome of step S97 (as shown in FIG. 12 and FIG. 14) are similar to the above-described non-limiting example implementation, and therefore, a duplicated description will be omitted.

When the friend list data is transmitted from the game apparatus 10, the server 72 stores the data for each game apparatus 10. As shown in FIG. 27, for example, the server 72 stores the friend list of the game apparatus 10 in correspondence with the ID, etc. of the game apparatus 10 in the on-line machine list storing area 84. The friend list includes an ID and a player name of the opponent. That is, in this non-limiting example implementation, the server 72 stores the friend list of the game apparatus as well as manages the ID, the player name, and the connection address of the game apparatus 10 which is being connected to the network in the on- line machine list. Therefore, the server 72 confirms whether or not the respective game apparatuses 10 register each other's identifying information of the opponents to prevent the game apparatuses 10 which don't register each other's identifying information from making a network communication.a27

The server 72 determines whether or not the game apparatus 10 which has transmitted the friend list, that is, the inquiry can make a network communication with other game apparatus 10 registered in the friend list. More specifically, the server 72 determines whether or not each of the opponent IDs in the received friend list is stored in the on-line machine list data as an ID of the on-line game apparatus 10. In addition, it is determined whether or not the ID of the game apparatus 10 which has transmitted the inquiry is present in the friend list of the other game apparatus 10 which is determined to be being connected with the server 72. If the server 72 determines that the opponent registered in the friend list is being connected to the server, and the identifying information of the game apparatus 10 is registered in the friend list of the opponent, the server 72 determines that a network communication is allowable with the opponent, and sends a response of the connection address of the opponent to the game apparatus 10. On the other hand, if the opponent registered in the friend list is not being connected with the server, and if the game apparatus which has transmitted the inquiry is not registered in the friend list of the opponent, it is determined that a network communication is not allowable with the opponent, and a response indicative of being incapable of communication with the opponent is sent.

Figure 28:
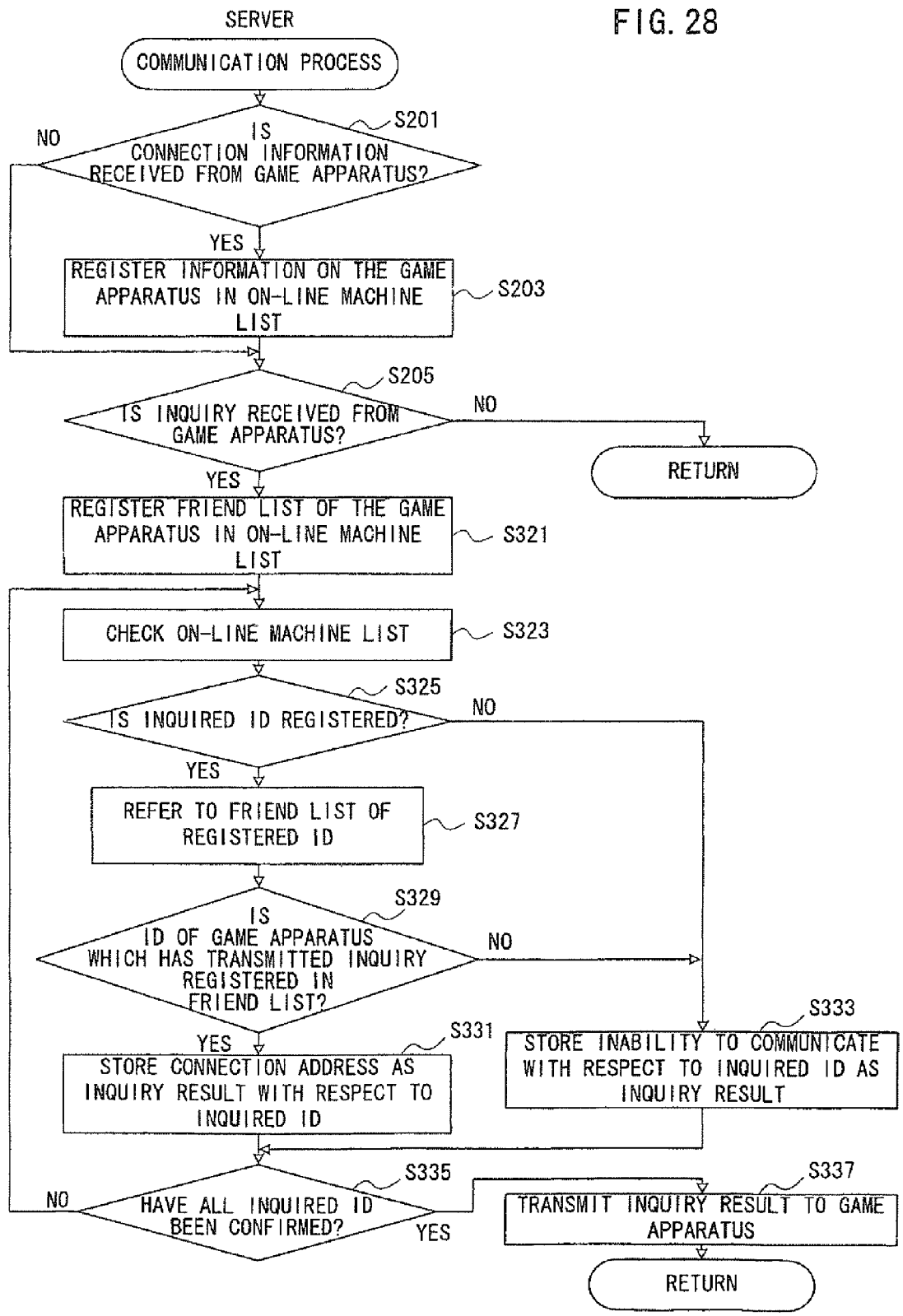
FIG. 28 is a flowchart showing one exemplary illustrative non-limiting implementation of an operation of a communication process in the server of another example implementation.

For example, FIG. 28 shows one example of an operation of a communication process of the server 72 in this non-limiting example implementation. The process from steps S201 to S205 in FIG. 28 is similar to the above-described FIG. 18, and therefore, similar reference numerals are utilized to omit a duplicated description If "YES" in the step 205 in FIG. 28, that is, an inquiry is received from the game apparatus 10, the CPU of the server 72 registers the friend list of the game apparatus 10 in the on-line machine list. That is, the CPU receives inquiry data (including friend list data), and extracts the friend list data of the game apparatus 10 from the received data. Then, IDs and player names of all the opponents included in the friend list data are stored in the on-line machine list storing area 84 by being brought into correspondence with the IDs of the game apparatus 10.

It should be noted that the CPU of the server 72 confirms whether or not the ID of the opponent in the received friend list is a normal number or a character string, and only the ID determined to be a normal is stored as the friend list of the on-line machine list. In the friend list of the on-line machine list data, only opponent's ID may be stored without storing opponent's player name.

Succeedingly, in a step S323, the CPU of the server 72 checks the opponent ID included in the inquiry data against the ID of the on-line game apparatus 10 stored in the on-line machine list storing area 84 to determine whether or not the opponent included in the friend list is being connected with the server 72. It should be noted that if a plurality of opponent IDs are included in the inquiry data, one ID is selected so as to be detected.

Then, in a step S325, the CPU of the server 72 determines whether or not the inquired ID is registered in the on-line machine list. If "YES" in the step 325, that is, if the inquired game apparatus 10 is being connected to the network, the CPU of the server 72 refers to the friend list of the registered ID in a step S327. That is, the ID registered in the friend list in correspondence with the ID determined to be being connected and the ID of the game apparatus 10 which has transmitted the inquiry is checked against with each other to determine whether or not the ID of the game apparatus 10 which has transmitted the inquiry is registered in the friend list of the opponent.

In a succeeding step S329, the CPU of the server 72 determines whether or not the ID of the game apparatus 10 which has transmitted the inquiry is registered in the friend list of other game apparatus 10 determined to be being connected. If "YES" in the step 329, the CPU of the server 72 reads the connection address corresponding to the inquired ID of the game apparatus which is being connected from the on-line machine list storing area 84, and stores the connection address as an inquiry result with respect to the inquired ID. That is, the inquiry result data is generated, while storing the connection address brought into correspondence with the inquired ID.

On the other hand, if "NO" in the step 329, that is, if the game apparatus of the inquired ID is stored in the on-line machine list, but the ID of the game apparatus which has transmitted the inquiry is not registered in the friend list of the inquired ID, the identifying information of the opponent is registered in only one of the game apparatus 10, it is considered that the identifying information is not exchanged, or it is considered that the other of the game apparatus refuses to communicate across a network, the process proceeds to a step S333.

Alternatively, if "NO" in the step 325, that is, if the game apparatus of the inquired ID is not connected to the network, the process proceeds to the step S333.

In the step S333, the CPU of the server 72 stores an inability to communicate with respect to the inquired ID as an inquiry result. That is, inquiry result data storing data indicative of an inability to communicate in correspondence with the inquired ID is generated.

After completion of the step S331 or the step S333, the CPU of the server 72 determines whether or not capability of the network communication has been confirmed as to all the inquired IDs in a step S335. If "NO" in the step 335, that is, if any ID on which a process from the step S323 to the step S333 is not performed out of the IDs included in the friend list obtained in the step S321 remains, the process returns to the step S323 to confirm the rest of the inquired ID. Thus, it is possible to generate inquiry result data to which capability of communication as to each of the inquired IDs is stored.

Then, if "YES" in the step 335, the CPU of the server 72 transmits the generated inquiry result data to the game apparatus which has transmitted the inquiry in a step S337. After completion of the step S337, the communication process is ended.

According to this non-limiting example implementation, since the identifying information of the opponent can be registered by hand, a communication game can be played via a network with even a friend who lives away from the player and with whom the player cannot directly meet. Also, a condition of the network communication is that each other's identifying information of the opponent are stored in the friend list, and therefore, it is possible to prevent a game apparatus from suddenly being connected by an unknown opponent, and prevent a game apparatus from being communicated with an unknown opponent who illegally obtains identifying information of the game apparatus.

Also, in each of the above-described non-limiting example implementation, in the short-distance wireless communication of the game apparatus 10, the identifying information is exchanged after the communication game process is executed. More specifically, as shown in FIG. 10, the CPU core 42 executes a communication game process in the step S41, and then, exchanges the identifying information in the steps S43 to S49. However, in another non-limiting example implementation, as to the short-distance wireless communication, even if a communication game process such as a game, an application, etc. is especially performed, the exchange of the identifying information may simply be performed. If so, even if the communication game and the application are not executed, the identifying information of the opponent can be easily obtained, and readily registered in the friend list.

Figure 29:
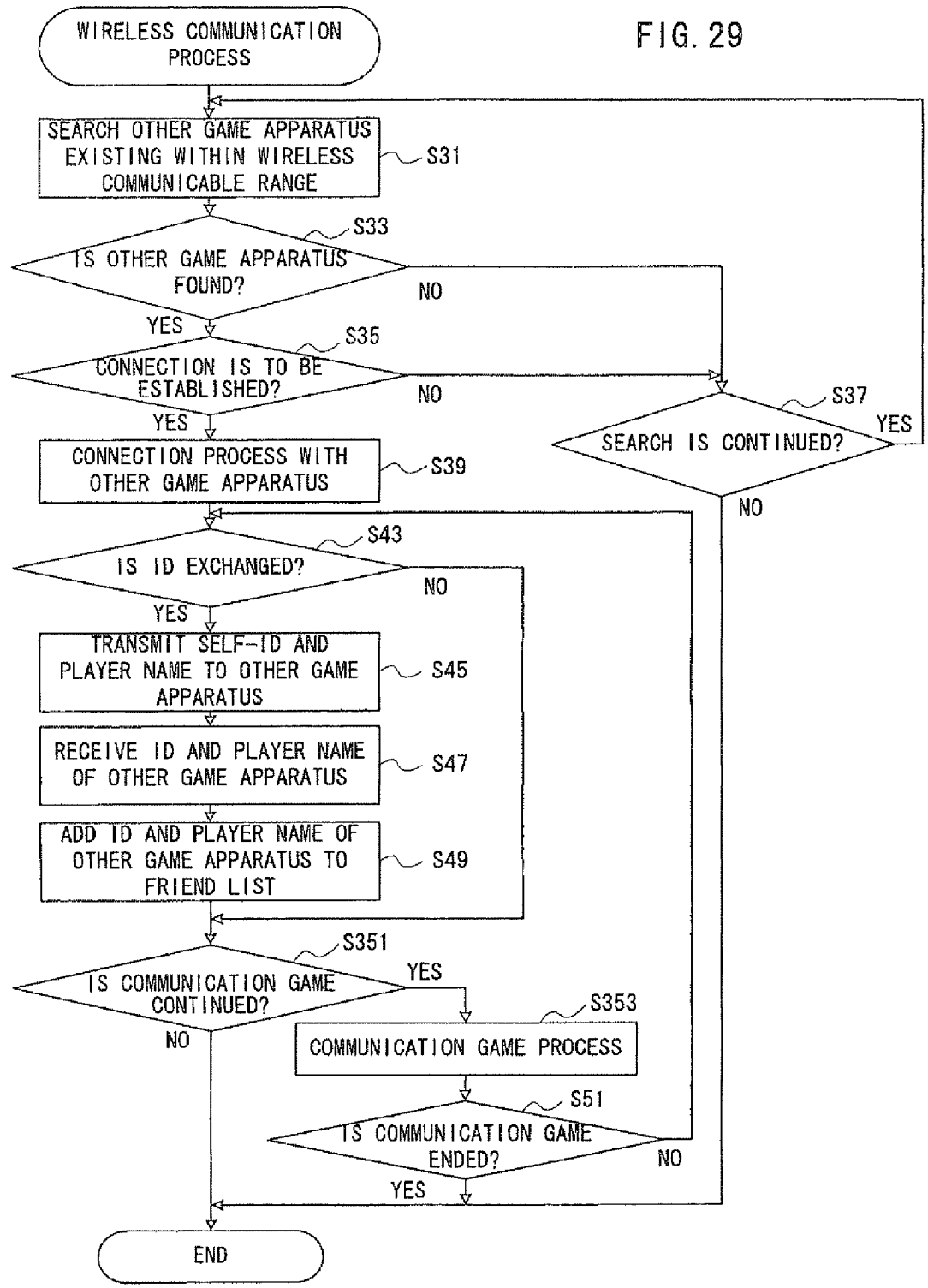
FIG. 29 is a flowchart showing a modified exemplary illustrative non-limiting implementation of an operation of a wireless communication process.

FIG. 29 shows one example of an operation of a wireless communication process in this non-limiting example implementation. In FIG. 29, the same parts as each step in FIG. 10 are designated by similar numerals, and a duplicated description will be omitted.

In a step S39 in FIG. 29, a connection process with other game apparatus 10 is executed, and then, the CPU core 42 determines whether or not an ID is to be exchanged with the other game apparatus 10 in the step S43. If "YES" in the step 43 the CPU core 42 executes an exchange of the IDs and registration of the ID in the friend list in steps S45 to S49. If "NO", the process directly proceeds to a step S351.

In the step S351, the CPU core 42 determines whether or not the communication game is to be continued. For example, the CPU core 42 determines whether or not continuation of the communication game is instructed on the basis of the input data from the operating switch 20 or the touch panel 22.

If "YES" in the step 351, the CPU core 42 executes a communication game process similarly to the step S41 in FIG. 10 in a step S353. Succeedingly, the CPU core 42 determines whether or not the communication game is ended in the step S51. If "NO", the process returns to the step S43. On the other hand, if "YES" in the step S51, or if "NO" in the step S351, the wireless communication process is ended.

In each of the above-described example implementations, the server 72 is provided on the network, the server 72 executes a process such as a management of the on-line machine list such as registration and delete of identifying information in the on-line machine list and delete, a check (detection of capability of connecting to the inquired ID) of the one-line machine list against the inquiry, and a transmission of a detection result. However, in another non-limiting example implementation, without providing the server 72 on the network, any or several of the plurality of game apparatuses 10, or each of the plurality of game apparatuses 10 may function as a server 72.

Although several exemplary illustrative non-limiting implementation of the present invention have been described and illustrated in detail, it is clearly understood that the same is by way of illustration and example only and is not to be taken by way of limitation, the spirit and scope of the present invention being limited only by the terms of the appended claims.

What is claimed is:

1. A server for a game system in which a plurality of game apparatuses communicate across a network, wherein each game apparatus stores its own self-identifying ID information and registered friend ID information, comprising:

a first storage area containing a list of game apparatuses connected to the network, the list including game apparatus identifying information and registered friends identifying information associated to each game apparatus connected to the network, wherein the registered friends identifying information of each game apparatus comprises an ID value associated to each friend registered to the game apparatus; and wherein the server is configured to permit a first and a second game apparatus to play a game with one another over the network only after checking information stored in the list and verifying that the list contains both (a) registered friend identifying information associated to the first game apparatus that includes an ID value identifying the second game apparatus as a registered friend of the first game apparatus and (b) registered friend identifying information associated to the second game apparatus that includes an ID value identifying the first game apparatus as a registered friend of the second game apparatus.

2. The server of claim 1 wherein the first storage area comprises multiple storage areas for storing a plurality of lists of game apparatuses connected to the network and wherein each list is associated with a particular multiplayer game and contains game name and game apparatus identifying information, including a network connection address for each game apparatus and registered friend identifying information received from each game apparatus.

3. The server according to claim 1 wherein one or more registered opponents stored within a game apparatus are registered via manual input operations performed on the game apparatus by a user.

4. The method according to claim 1 wherein one or more registered opponents stored within a game apparatus are registered automatically by the game apparatus during a short-distance range type wireless communication.

5. The server in a communication game system according to claim 1 wherein the self-identifying ID information used for each game apparatus is non-matching.

6. A method for enabling a plurality of game apparatuses to play with one another in a multiplayer game across a network, wherein each game apparatus stores its own self-identifying information and registered friends' ID information, comprising:

providing a network server configured to communicate with one or more game apparatuses requesting to play a multiplayer game with another over the network;

maintaining in a first storage area on the server a list of game apparatuses connected to the network, the list including self-identifying information and associated registered friends' ID information for each game apparatus, wherein the registered friends' ID information for each game apparatus includes one or more friend identifying ID value that was registered to the game apparatus; and configuring the server to permit a first and a second game apparatus to play in a game with one another over the network only after the server checks information maintained in one or more of registered friends' ID information and verifies that the list contains both (a) registered friends' ID information associated with the first game apparatus that includes a friend identifying ID value identifying the second game apparatus as a registered friend and (b) registered friends' ID information associated with the second game apparatus that includes a friend identifying ID value identifying the first game apparatus as a registered friend.

7. A method according to claim 6 wherein the first storage area comprises multiple storage areas for storing a plurality of game lists wherein each game list is associated with a particular multiplayer game and contains identifying information for each game apparatus connected to the network, including a network connection address for each game apparatus connected to the network to play the particular game.

8. The method according to claim 6 wherein one or more registered opponents stored within a game apparatus are registered via manual input operations performed on the game apparatus by a user.

9. The method according to claim 6 wherein one or more registered opponents stored within a game apparatus are registered automatically by the game apparatus during a short-distance range type wireless communication.

10. A method according to claim 6 wherein the self-identifying ID information used for each game apparatus is non-matching.

11. A computer readable non-transitory physical storage medium storing program instructions for controlling a network server to allow a plurality of game apparatuses to play with one another in a multiplayer game across a network, wherein each game apparatus stores its own self-identifying information and a registered friends' ID information, the program instructions causing the server to perform operations comprising:
    communicating with one or more game apparatuses requesting to play a multiplayer game with another over the network;
    maintaining in a first storage area on the server a list of game apparatuses connected to the network, the list including self-identifying information and registered friends' information associated to each game apparatus connected to the network, wherein the registered friends' information associated to each game apparatus comprises one or more registered friend ID information and
    enabling a first and a second game apparatus to play in a game with one another over the network only after checking information maintained in the first storage area to verify that the list contains both (a) registered friend ID information associated to the first game apparatus that includes a first ID value identifying the second game apparatus as a registered friend and (b) registered friend ID information associated to the second game apparatus that includes a second ID value identifying the first game apparatus as a registered friend.

12. The non-transitory physical storage medium of claim 11 further including program instructions for creating within the first storage area multiple storage areas for storing a plurality of separate lists of game apparatuses connected to the network wherein each list is associated with a particular multiplayer game and contains game name and game apparatus self-identifying ID information and an associated network connection address, and further includes registered opponent information received from each game apparatus upon requesting to be connected to the network to play the particular multiplayer game.

13. Network communication processing program instructions according to claim 11 wherein the self-identifying ID information used for each game apparatus is non-matching.

14. A method enabling selective multiplayer gaming between distant friends over a network, comprising:
    providing a network server configured to communicate with one or more game apparatuses requesting to play in a game with one another over the network;
    maintaining on the server a list of game apparatuses currently connected to the network, the list including game apparatus identifying information and registered friend information received from each game apparatus, wherein the registered friend information received from each game apparatus includes one or more registered friend ID value; and
    configuring the server to check the registered friend information maintained in the list for a requested game apparatus upon receiving a request from a first game apparatus to communicate with a second game apparatus over the network, and to permit the first and the second game apparatus to play a game with one another over the network only after verifying that the list contains both (a) registered friend identifying information received from the first game apparatus that includes a friend ID value identifying the second game apparatus as a registered friend and (b) registered friend identifying information received from the second game apparatus that includes a friend ID value identifying the first game apparatus as a registered friend.

15. A method according to claim 14 wherein the information maintained by the server also includes network connection address information of each game apparatus currently connected to the network, and the server sends a network connection address of the second game apparatus to the first game apparatus only after the server verified both (a) and (b).

16. A method according to claim 14 wherein the information maintained by the server also includes game name information indicative of different multiplayer games and a plurality of storage areas for storing separate lists of game apparatuses that are currently connected to the network according to game name.

17. A method according to claim 14 wherein the game apparatus identifying information used for each game apparatus is non-matching.

18. A server for a game system in which a plurality of game apparatuses communicate and play across a network, wherein each game apparatus stores self-identifying information along with an associated network connection address and registered friends' identifying information, the server comprising:
    a data storage containing a list of game apparatuses connected to the network, the list including game apparatus identifying information and separate associated registered friend information received from each game apparatus individually upon being connected to the network, wherein the server is configured to communicate with each game apparatus connecting to the network and to receive from each said game apparatus its identifying information along with associated registered friend information, the server also being configured to store and maintain registered friend information received individually from each game apparatus, and the server further being configured to permit a first and a second game apparatus to play a game with each other over the network only after checking the data storage for stored information received from each game apparatus and verifying that both (a) the registered friend information received from the first game apparatus includes information for identifying the second game apparatus as a registered friend and (b) that the registered friend information received from the second game apparatus includes information for identifying the first game apparatus as a registered friend.

* * * * *